(12) United States Patent
Wilson

(10) Patent No.: US 7,867,471 B2
(45) Date of Patent: Jan. 11, 2011

(54) PROCESS FOR PREPARING ADVANCED CERAMIC POWDERS USING ONIUM DICARBOXYLATES

(75) Inventor: Wilfred Wayne Wilson, Bastrop, TX (US)

(73) Assignee: SACHEM, Inc., Austin, TX (US)

( * ) Notice: Subject to any disclaimer, the term of this patent is extended or adjusted under 35 U.S.C. 154(b) by 98 days.

(21) Appl. No.: 12/417,793

(22) Filed: Apr. 3, 2009

(65) Prior Publication Data

US 2009/0250850 A1   Oct. 8, 2009

Related U.S. Application Data

(60) Provisional application No. 61/042,173, filed on Apr. 3, 2008.

(51) Int. Cl.
*C01G 1/00* (2006.01)

(52) U.S. Cl. .................. 423/592.1; 423/593.1; 423/635; 423/636; 423/638; 423/639; 423/630; 423/324; 423/327.1; 423/331; 423/263; 423/610; 423/598; 423/594.7; 423/607; 423/606; 423/605; 423/632; 423/594.19; 423/604; 423/622; 423/624; 423/618; 423/608; 423/594.17; 423/252; 423/594.18; 423/617; 423/619; 423/253; 423/249; 423/251; 423/594.8; 423/594.9; 423/594.12; 423/594.13; 423/594.14; 423/594.16

(58) Field of Classification Search ...... 423/592.1–600, 423/594.7–594.14, 594.16, 593.1, 594.18, 423/594.19, 604–639, 249–263, 324–331, 423/594.17

See application file for complete search history.

(56) References Cited

U.S. PATENT DOCUMENTS

| | | | |
|---|---|---|---|
| 3,215,572 A | 11/1965 | Papell | |
| 4,019,994 A | 4/1977 | Kelley | 252/62.52 |
| 4,329,241 A | 5/1982 | Massart | 252/62.52 |
| 4,576,921 A | 3/1986 | Lane | 501/12 |
| 4,619,817 A | 10/1986 | Stambaugh et al. | 423/266 |
| 4,804,649 A | 2/1989 | Sherif | 505/1 |
| 4,839,339 A | 6/1989 | Bunker et al. | 505/1 |
| 5,002,926 A | 3/1991 | Spencer et al. | 505/1 |
| 5,082,811 A | 1/1992 | Bruno | 501/134 |
| 5,087,437 A | 2/1992 | Bruno et al. | 423/598 |
| 5,116,560 A | 5/1992 | Dole et al. | 264/65 |
| 5,135,732 A | 8/1992 | Barboux et al. | 423/593 |
| 5,149,682 A | 9/1992 | Spencer et al. | 505/1 |
| 5,196,388 A | 3/1993 | Shyu | 501/134 |
| 5,211,933 A | 5/1993 | Barboux et al. | 423/596 |
| 5,252,314 A | 10/1993 | DeGuire et al. | 423/593 |
| 5,407,618 A | 4/1995 | Stephenson | 264/63 |
| 5,863,867 A | 1/1999 | Sengupta et al. | 505/121 |
| 5,883,828 A | 3/1999 | Cuchiaro et al. | 365/145 |
| 5,908,802 A | 6/1999 | Voigt et al. | 501/134 |
| 5,929,259 A | 7/1999 | Lockemeyer | 549/534 |
| 5,977,041 A | 11/1999 | Honda | 510/175 |
| 6,078,494 A | 6/2000 | Hansen | 361/321.5 |
| 6,129,903 A | 10/2000 | Kerchner | 423/598 |
| 6,152,148 A | 11/2000 | George et al. | 134/2 |
| 6,576,156 B1 | 6/2003 | Ratna et al. | 252/301.4 |
| 6,797,648 B2 | 9/2004 | Aoki et al. | 438/782 |
| 6,887,296 B2 | 5/2005 | Mende et al. | 75/351 |
| 7,001,585 B2 | 2/2006 | Swanson | 423/598 |
| 7,033,406 B2 | 4/2006 | Weir et al. | 29/23.5 |
| 7,169,370 B2 | 1/2007 | Mesmin et al. | 423/3 |
| 7,179,441 B2 | 2/2007 | Jung et al. | 423/593.1 |
| 7,252,791 B2 | 8/2007 | Wasserscheid et al. | 252/364 |
| 7,504,172 B2 | 3/2009 | Irvine et al. | 429/30 |
| 2001/0039251 A1 | 11/2001 | Sachdev et al. | 510/177 |
| 2002/0150531 A1 | 10/2002 | Ohmori et al. | 423/598 |
| 2003/0044347 A1 | 3/2003 | Shirakawa et al. | 423/598 |
| 2006/0018815 A1 | 1/2006 | Suda | 423/263 |
| 2007/0148065 A1 | 6/2007 | Weir et al. | 423/1 |
| 2007/0202036 A1 | 8/2007 | Jongen et al. | 423/593.1 |
| 2008/0031796 A1 | 2/2008 | Weir et al. | 423/263 |
| 2008/0098932 A1 | 5/2008 | Perlet et al. | |

FOREIGN PATENT DOCUMENTS

| | | |
|---|---|---|
| JP | 55-154321 | 1/1980 |
| JP | 63270348 | 11/1988 |
| JP | 63307102 | 12/1988 |
| JP | 11-147716 | 2/1999 |
| JP | 2003-192343 | 9/2003 |
| WO | 91/13043 | 9/1991 |

(Continued)

OTHER PUBLICATIONS

Translation of Japan 63-307102, Dec. 14, 1988.*

(Continued)

*Primary Examiner*—Steven Bos
(74) *Attorney, Agent, or Firm*—Renner, Otto, Boisselle & Sklar, LLP

(57) ABSTRACT

A process of producing a ceramic powder including providing a plurality of precursor materials in solution, wherein each of the plurality of precursor materials in solution further comprises at least one constituent ionic species of a ceramic powder, combining the plurality of precursor materials in solution with an onium dicarboxylate precipitant solution to cause co-precipitation of the ceramic powder precursor in a combined solution; and separating the ceramic powder precursor from the combined solution. The process may further include calcining the ceramic powder precursor.

11 Claims, 6 Drawing Sheets

FOREIGN PATENT DOCUMENTS

| WO | 92/18425 | 10/1992 |
|---|---|---|
| WO | 93/16012 | 8/1993 |
| WO | 98/39800 | 9/1998 |
| WO | 2008017047 | 2/2008 |

OTHER PUBLICATIONS

XP-002562717; Boyle et al; Rechargeable Lithium Battery Cathodes. Nonaqueous Synthesis, Characterization, and Electrochemical Properties of LiCoO2; Chem. Mater. 1998, 10, pp. 2270-2276.
PCT/US2009/039389; PCT International Search Report dated Jan. 12, 2010.
Murugan et al.; "A coprecipitation technique to prepare $SR_{0.5}Ba_{0.5}Nb_2O_6$" Bull Master Sci.; vol. 29, No. 3, Jun. 2006; pp. 221-223.
Bunker et al.; "Precipitation of Superconductor Precursor Powders"; pp. 121-129 and Clark et al.; "Oxalate Precipitation Methods for Preparing the Yttrium-Barium-Copper Superconducting Compound"; pp. 153-159, both in Hatfield et al.; "High-Temperature Superconducting Materials"; copyright 1988 by Marcel Dekker, Inc.
Khollam et al.; "Simple oxalate precursor route for the preparation of barium-strontium titanate: $Ba_{1-x}Sr_xTiO_3$ powders"; Materials Characterization 54; 2004; pp. 63-74.
Li et al.; "Simple oxalate precursor route for the preparation of brain-like shaped barium-strontium titanate: $Ba_{0.6}Sr_{0.4}TiO_3$"; Materials Chemistry and Physics 112; 2008; pp. 337-341.
Ni et al.; "$LiFePO_4$ doped with ions prepared by co-precipitation method"; Materials Letters 59; 2005; pp. 2361-2365.
van der Gijp et al.; "An oxalate-peroxide complex used in the preparation of doped barium titanate"; J. Mater. Chem.; 1998, 8(5); pp. 1251-1254.
Roeder et al.; "Stoichiometry Control and Phase Selection in Hydrothermally Derived $Ba_xSr_{1-x}TiO_3$ Powders"; J. Am. Ceram. Soc. 82(7); 1999; pp. 1665-1675.
Bagul; "Preparation of Dense Barium Cerate Film on a Planar Porous Support for Hydrogen Separation Membranes"; Thesis presented to the Graduate School of the University of Florida; 2004; 85 pages.
Shaw; "Preparation and Sintering of Homogeneous Silicon Nitride Green Compacts"; Journal of the American Ceramic Society; vol. 69, No. 2, 1985; pp. 88-93.
Auzans; "Mn-Zn ferrite nanoparticles for water- and hydrocarbone-based ferrofluids: preparation and properties;" Thesis; Institute of Physics of Latvian University; 1999.
Cho et al.; "Low temperature hydrothermal synthesis and formation mechanisms of lead titanate ($PbTiO_3$) particles using tetramethylammonium hydroxide: thermodynamic modelling and experimental verification"; Journal of the European Ceramic Society 23; 2003; pp. 2323-2335.
Morgan et al.; "Preparation of 1-2-3 Superconductors from Hydroxide-Carbonate Coprecipitation"; Journal of the American Ceramic Society; vol. 73, No. 12; pp. 3557-3561; 1990.
Guedes et al.; "Effect of Quaternary Ammonium Hydroxides on the Stabilization of $Al_2O_3$ Aqueous Suspensions"; Materials Science Forum; vols. 455-456; 2004; pp. 631-634.
Yang et al.; "Hydrothermal Synthesis of Nanosized Titania Powders: Influence of Tetraalkyl Ammonium Hydroxides on Particle Characteristics"; Journal of the American Ceramic Society; vol. 84, No. 8; 2000; pp. 1696-1702.
Burnside et al.; "Self-Organization of $TiO_2$ Nanoparticles in Thin Films"; Chem. Mater.; 1998; 10; pp. 2419-2425.
Sookman et al.; "Effect of Base Type on Properties of NiO Synthesized by Sol-Gel Method"; Adv. in Tech. of Mat. and Mat. Proc. J. (ATM); vol. 8 [1] 73-76; 2006.
Chemseddine et al.; "Nanostructuring Titania: Control over Nanocrystal Structure, Size, Shape, and Organization"; Eur. J. Inorg. Chem.; 1999; pp. 235-245.
Xu et al.; "Preparation of Monodispersed Tin-Doped Indium Oxide Powders by Hydrothermal Method"; J. Am. Ceram. Soc. 88[4]; 2005; pp. 986-988.
Pithan et al.; "Progress in the Synthesis of Nanocrystalline $BaTiO_3$ Powders for MLCC"; Int. J. Appl. Ceram. Technology, 2[1]; 2005; pp. 1-14.
Tourinho et al.; "Aqueous ferrofluids based on manganese and cobalt ferrites"; Journal of Materials Science 25; 1990; pp. 3249-3254; 1990.
Rhee et al.; "Anomalous Behavior of the $T_2$ Relaxation Time of Hydrogen Protons in a Highly Concentrated Iron-Ferrite Nanoparticle Solution"; Journal of Korean Physical Society; Vo. 45, No. 4; Oct. 2004; pp. 1037-1039.
Cot et al.; "Preparation and Characterization of Colloidal Solution Derived Crystallized Titania Powder"; Journal of European Ceramic Society; 1998; vol. 18, No. 14; pp. 2175-2181.
Jeon et al.; "Hydrothermal Synthesis of Er-Doped Luminescent $TiO_2$ Nanoparticles"; Chem. Mater., 2003, 15, pp. 1256-1273.
Yang et al.; "Hydrothermal Synthesis of Nanosized Titania Powders: Influence of Peptization and Peptizing Agents on the Crystalline Phases and Phase Transactions"; Journal of the American Ceramic Society; vol. 83, Issue 6; 2004; pp. 1361-1368.
Pinceloup et al.; "Hydrothermal Synthesis of Nanometer-Sized Barium titanate Powders: Control by Barium/Titanium Ratio, Sintering, and Dielectric Properties"; > J. Am. Ceram. Soc. 82 [11]; pp. 3049-3056; 1999.
Petrovic et al.; Hydrothermal Synthesis of Lead Zirconate Titanate ($PbZr_{0.52}Ti_{0.48}O_3$); Proceedings of the Tenth IEEE International Symposium; vol. 2, Aug. 1996; pp. 735-738.
MacLaren et al.; Hydrothermal synthesis and characterization of perovskite $BaZn_{frax;1;3}Ta_{frax;2;3}O_3$; J. Mater. Chem., 1999, 9, pp. 2663-2670; 1999.
Ekis et al.; "The Role of Binder in Tape Casting MLC Devices"; Passive Component Industry, Nov./Dec. 2000; pp. 29-34.
Wang et al.; "Ambient Condition Synthesis and Characterization of nanocrystalline $BaTiO_3$"; Ceramic Transactions; vol. 148; pp. 21-37; 2004.
Caruso et al; "Powder Manufacture for Passive Components"; Passive Component Industry; Nov./Dec. 2000; pp. 24-28.
Warner et al.; "Preparation and Characterization of Ceramic Powders for Electronics"; Ceramic Transactions; vol. 15 1990; pp. 51-69.
Riman; "The Chemical Synthesis of Ceramic Powders"; Surface and Colloid Chemistry in Advanced Ceramics Processing; 1993; pp. 29-69.
Adair et al.; "A Review of the Processing of Electronic Ceramics with an Emphasis on Multilayer Capacitor Fabrication"; Journal of Materials Education; originally published as Chapter IX of Fabrication of Composites, vol. 4 of the series entitled "Handbook of Composites"; 1983.
Bruno et al.; "High-Performance Multilayer Capacitor Dielectrics from Chemically Prepared Powders"; J. Am. Ceram. Soc. 76[5]; pp. 1233-1241; 1993.
Wang et al.; "Synthesis of nanocrystalline $BaTiO_3$ by solvent refluxing method"; Journal of Materials Science Letters, 22; pp. 557-559; 2003.
Gaikwad et al.; "A co-precipitation technique to prepare $BiNbO_4$, $MgTiO_3$ and $Mg_4Ta_2O_9$ powders"; Materials, Research Bulletin 41; pp. 347-353; 2006.
Deshpande et al.; "A coprecipitation technique to prepare $ZnNb_2O_6$ powders"; Bull. Mater. Sci., vol. 28, No. 3; Jun. 2005; pp. 205-207.
Kim et al.; "Synthesis of $Pb(Zr, Ti)O_3$ Nanopowders by Milling Coprecipitation Method"; Journal of Electroceramicsl; vol. 13, Nos. 1-3; Jul. 2004; pp. 367-371. (Abstract only).
Xu et al.; "Hydrothermal Synthesis of Bismuth Titanate Powders"; J. Am Ceram. Soc. 86 [10]; 2003; pp. 1815-1817.
Frey et al.; "The Role of Interfaces on an Apparent Grain Size Effect on the Dielectric Properties for Ferroelectric Barium Titanate Ceramics"; Ferroelectrics; vols. 206-207; 1998; pp. 337-353.
Roeder et al.; "Low Temperature Hydrothermal Processing (<100°C) of Stoichiometric $Ba_xSr_{1-x}TiO_3$ Thin Films and Powders"; Mat. Res. Soc. Symp. Proc.; vol. 432; Materials Research Society; 1997; pp. 195-201.
Albano et al.; "Concentrated aqueous $Si_3N4$-$Y_2O_3$-$Al_2O_3$ slips stabilized with tetramethylammonium hydroxide"; Ceramica; vol. 45; No. 295; Aug./Oct. 1999.
Bergstrom et al.; "Interfacial Characterization of Silicon Nitride Powders"; Journal of the American Ceramic Society, vol. 72, No. 1; 1989; pp. 103-109. (Best available copy).

Stuber et al.; "From Rust to High Tech: Semi-Synthesis of a Ferrofluid Using FeO Nanoparticles"; *The Chemical Educator*, vol. 10, No. 3; 2005. (4 pp.).

Chun et al.; "Synthesis of an Aqueous Ferrofluid"; The California Nanosystems Institute & Materials Creation Training Program, University of California, Los Angeles, Science Outreach Program; Nov. 2005. (12 pp.).

Tourinho et al.; "Aqueous ferrofluids based on manganese and cobalt ferrites"; *Journal of Materials Science*;vol. 25, No. 7; pp. 3249-3254; 1990.

Cho et al.; "Low temperature hydrothermal synthesis and formation mechanisms of lead titanate ($PbTiO_3$) particles using tetramethylammonium hydroxide: thermodynamic modelling and experimental verification"; Journal of the European Ceramic Society; vol. 23, No. 12; pp. 2323-2335; 2003.

Sengupta; "High-Temperature Superconductors: Synthesis Techniques and Application Requirements"; JOM; vol. 50, No. 10, Oct. 1998; 9 pages.

Roeder et al.; "Low Temperature Hydrothermal Processing (<100°C) of Stoichiometric $Ba_xSr_{1-x}TiO_3$ Thin Films and Powders"; *Mat. Res. Soc. Symp. Proc.*; vol. 432; Materials Research Society; 1997; pp. 195-201. (Complete Copy).

\* cited by examiner

BST Oxalate-$NH_4^+$ slurry

BST Oxalate-TMA+ slurry

BST Oxalate-$NH_4^+$ slurry - redispersed

BST Oxalate-TMA+ slurry - redispersed

US 7,867,471 B2

PROCESS FOR PREPARING ADVANCED CERAMIC POWDERS USING ONIUM DICARBOXYLATES

CROSS-REFERENCE TO RELATED APPLICATION

The present application is related to and claims benefit under 35 U.S.C. 119(e) to co-pending U.S. Provisional Application No. 61/042,173, filed 3 Apr. 2008, by the same title, the entirety of which is incorporated herein by reference.

TECHNICAL FIELD

The present invention relates to preparation of advanced ceramic powders, using onium dicarboxylate compounds as a precipitant to precipitate ceramic powder precursors from solutions of the metals, and subsequent conversion of the ceramic powder precursors to the desired metal oxide material. The onium dicarboxylate precipitant may be used in a coprecipitation procedure for the preparation of the desired ceramic powders, to obtain advanced ceramic materials.

BACKGROUND

Ceramic powders are produced for various uses, including specialized mechanical components, coatings for mechanical components, in semiconductor devices (e.g., as High-K dielectric structures), superconducting devices, motion sensors, fuel cells, device packaging, passive electronic components such as capacitors, and more sophisticated energy storage devices and as advanced engineering materials for industries ranging from automobiles to biomedical devices. Numerous techniques exist for the synthesis and fabrication of ceramic powders including solid phase synthesis such as solid-solid diffusion, liquid phase synthesis such as precipitation and co-precipitation, and synthesis using gas phase reactants. Moreover, a host of related fabrication techniques can also be used including: spray drying, spray roasting, metal organic decomposition, freeze drying, sol-gel synthesis, melt solidification, and the like.

In the liquid phase synthesis processes, the metal oxides have been precipitated by the use of oxalic acid and certain of its simple salts. However, various difficulties attend the use of many oxalates, such as unwanted contaminants in the ceramic powder. For example, when alkali or alkaline earth metal oxalates are used, the resulting metal oxide powders may include unacceptable levels of the alkali or alkaline earth metals. As another example, if the oxalate added includes ions such as ammonium ($NH_4^+$) that act as a buffer or complexing agent in the solution, control of the pH of the solution may be difficult, resulting in loss of control of product properties.

As the critical dimensions in semiconductor devices continue to be reduced, the impact of even very low levels of trace impurities and even small variations in the atomic and molecular structure of the material become increasingly significant. For example, in high permittivity or high dielectric constant ("Hi-K") materials, the break-down voltage can become unacceptably low, resulting in the failure of the function of the Hi-K dielectric material, if either or a combination of the levels of trace metal impurities or micro-structure defects become too high. Micro-structure defects can result from a poorly controlled particle size distribution, too large particles, and/or from the presence of impurities, for example. Metal impurities, with or without micro-structure defects, can adversely affect the dielectric properties and breakdown voltage.

In superconductor materials, it is well known that the superconducting properties of the superconductor materials critically depend upon the exact combination of metals in the ceramic powder from which the superconductor material is made. Thus, control of the content of both all component metals and any traces of impurity metals becomes critical to the success or failure of the function of the superconductor.

For at least these reasons, a strong and growing need exists for new methods and materials for use in preparation of the desired ceramic powders, to obtain the ceramic powders having improved properties such as one or more of improved particle size distribution, reduced particle size, reduced metal impurities and improved particle morphology, improved compositional homogeneity, improved control of stoichiometry, improved re-dispersability and enhanced chemical stability.

SUMMARY

The present invention addresses the strong and growing need for new methods and materials for use in preparation of ceramic powders. The present invention can provide the desired ceramic powders having improved properties such as one or more of improved particle size distribution, reduced particle size, reduced metal impurities and improved particle morphology, improved compositional homogeneity, improved control of stoichiometry, improved re-dispersability and enhanced chemical stability, as compared to a ceramic powder made by a process not including the onium dicarboxylate as precipitant.

The present invention relates to the use of onium salts of organic diacids, i.e., onium salts of dicarboxylic acids as precipitants for metal ions to produce ceramic powder precursors for production of ceramic powders. The present inventor has discovered that by the use of onium dicarboxylates, as defined herein, ceramic powders having superior and unexpectedly improved properties can be obtained.

In one embodiment, the dicarboxylate is an oxalate. Thus, in one embodiment, the present invention includes the use of quaternary, tertiary, or imidazolium oxalates, such as tetraalkyl ammonium or phosphonium (quaternaries) oxalates, trialkyl sulfonium (tertiary) oxalates, trialkyl sulfoxonium (tertiary) oxalates, and imidazolium oxalates including, for example, one or a mixture of tetramethyl ammonium oxalate, tetrabutylammonium oxalate, and higher alkyl-substituted quaternary onium oxalates, as the metal precipitant in a coprecipitation process for preparing the ceramic powder precursors used in making the desired ceramic powders.

Thus, in one embodiment, the present invention relates to a process of producing a ceramic powder comprising:

providing a plurality of precursor materials in solution, wherein each of the plurality of precursor materials in solution further comprises at least one constituent ionic species of a ceramic powder, combining the plurality of precursor materials in solution with an onium dicarboxylate precipitant solution to cause co-precipitation of the ceramic powder precursor in a combined solution; and separating the ceramic powder precursor from the combined solution.

In one embodiment, the precipitant solution is substantially free of ammonium ion.

In another embodiment, the present invention relates to a process of producing a ceramic powder comprising:

providing a plurality of precursor materials in solution, wherein each of the plurality of precursor materials in solution further comprises at least one constituent ionic species of a ceramic powder, combining the plurality of precursor materials in solution with an onium oxalate precipitant solution substantially free of ammonium ion to cause co-precipitation of the ceramic powder precursor in a combined solution;

separating the ceramic powder precursor from the combined solution;

calcining the separated ceramic powder precursor to form a ceramic powder;

forming the ceramic powder into a green body; and sintering the green body.

In one embodiment, the onium dicarboxylate comprises a quaternary onium having general formula (II):

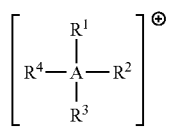

(II)

wherein in formula (II), A is a nitrogen or phosphorus atom, $R^1$, $R^2$, $R^3$ and $R^4$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms, when substituted, said substitution comprises one or more substituent selected from any of the foregoing alkyl, hydroxyalkyl or alkoxyalkyl groups, or $R^1$ and $R^2$ or $R^3$ together with A may form a heterocyclic group provided that if the heterocyclic group contains a C=A group, $R^3$ is the second bond.

In one embodiment, the onium dicarboxylate comprises a tertiary sulfonium having general formula (III):

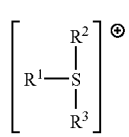

(III)

wherein in formula (III), $R^1$, $R^2$ and $R^3$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms, when substituted, said substitution comprises one or more substituent selected from any of the foregoing alkyl, hydroxyalkyl or alkoxyalkyl groups, or $R^1$ and $R^2$ or $R^3$ together with A may form a heterocyclic group provided that if the heterocyclic group contains a C=S group, $R^3$ is the second bond.

In one embodiment, the onium dicarboxylate comprises a tertiary sulfoxonium having general formula (IV):

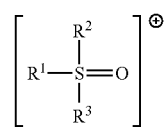

(IV)

wherein in formula (IV), $R^1$, $R^2$ and $R^3$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms, when substituted, said substitution comprises one or more substituent selected from any of the foregoing alkyl, hydroxyalkyl or alkoxyalkyl groups, or $R^1$ and $R^2$ or $R^3$ together with A may form a heterocyclic group provided that if the heterocyclic group contains a C=S group, $R^3$ is the second bond.

In one embodiment, the onium dicarboxylate comprises an imidazolium having general formula (V):

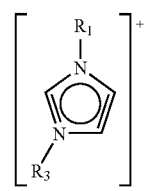

(V)

wherein in formula (V), $R^1$ and $R^3$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms, when substituted, said substitution comprises one or more substituent selected from any of the foregoing alkyl, hydroxyalkyl or alkoxyalkyl groups.

In one embodiment, the onium dicarboxylate comprises one or more of oxalate, malonate, succinate, glutarate, adipate, carbonate, maleate, fumarate, phthalate, isophthalate and terephthalate.

In one embodiment, the onium dicarboxylate comprises tetramethyl ammonium oxalate. In one embodiment, the onium dicarboxylate comprises tetramethyl ammonium oxalate and a second onium oxalate wherein the second onium has a general formula (II):

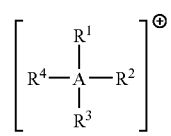

(II)

wherein in formula (II), A is a nitrogen or phosphorus atom, $R^1$, $R^2$, $R^3$ and $R^4$ are each independently an alkyl group containing from 4 to about 20 carbon atoms.

In one embodiment, the precursor materials comprise ions of one or a combination of two or more of: Mg, Ca, Sr, Ba, Al, Si, Sc, Ti, V, Cr, Mn, Fe, Co, Ni, Cu, Zn, Ga, Ge, Y, Zr, Nb, Mo, Tc, Ru, Rh, Th, Pd, Ag, Cd, In, Sn, Sb, Si, La, Hf, Ta, W, Re, Os, Ir, Pt, Tl, Pb, Bi, Ce, Pr, Nd, Pm, Sm, Eu, Gd, Dy, Er, Ho, Er, Tm, Tb, Th, Pa, U, Np and Pu.

In one embodiment, the process further comprises calcining the ceramic powder precursor to produce the ceramic powder. In one embodiment, the calcining is conducted at a temperature in the range from about 200° C. to about 1500° C. for a time in the range from about 1 minute to about 24 hours.

In one embodiment, the process further comprises sintering the ceramic powder to form a ceramic article, product or structure. In one embodiment, the sintering is carried out at a temperature in the range from about 1000° C. to about 3000° C. for a time in the range from about 1 minute to about 24 hours.

Based on the foregoing features, and as described in detail in the following, the present invention addresses the problem of providing ceramic powders exhibiting improved properties such as one or more of improved particle size distribution, reduced particle size, reduced metal impurities and improved particle morphology, improved compositional homogeneity, improved control of stoichiometry, improved re-dispersability and enhanced chemical stability, as compared to similar ceramic powders made by prior art processes, i.e., as compared to an otherwise identical ceramic powder made by a process not including the onium dicarboxylate as precipitant.

Figure 1:
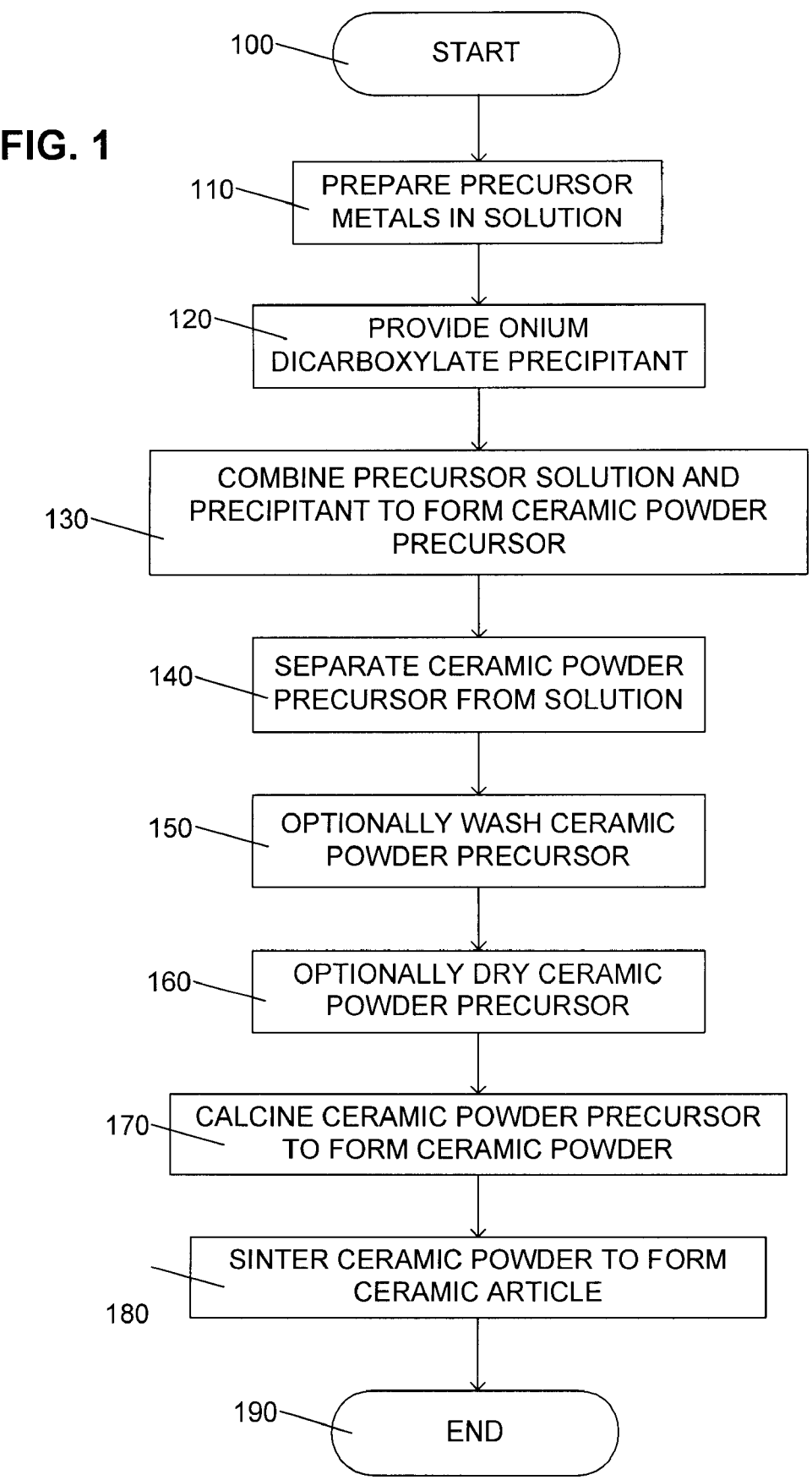
FIG. 1 is a schematic flow diagram of a process in accordance with an embodiment of the present invention.

It should be appreciated that the process steps and structures described below may not form a complete process flow for producing end-useable ceramic materials from metal precursors. The present invention can be practiced in conjunction with compositions and processing techniques currently used in the art, and only so much of the commonly practiced process steps are included as are necessary for an understanding of the present invention.

DETAILED DESCRIPTION

Throughout the specification and claims, the range and ratio limits may be combined. It is to be understood that unless specifically stated otherwise, reference to "a", "an", and/or "the" may include one or more than one, and that reference to an item in the singular may also include the item in the plural. All combinations specified in the specification and claims may be combined in any manner, and any one or more individual element of a group of elements may be omitted from or restricted out of the group.

Certain of the embodiments of the invention briefly described in the foregoing Summary are described in more detail in the following written description and accompanying drawings, so as to enable a person of skill in the art to make and use the invention.

Onium Dicarboxylates

Onium dicarboxylate, as used herein, includes quaternary ammonium dicarboxylates, quaternary phosphonium dicarboxylates, tertiary sulfonium dicarboxylates, tertiary sulfoxonium dicarboxylates and imidazolium dicarboxylates. The dicarboxylate may be oxalate, malonate, succinate, glutarate, adipate, carbonate, maleate, fumarate, phthalate, isophthalate and terephthalate, a mixture and/or combination of any of the foregoing. In one embodiment, the dicarboxylate is other than carbonate. As will be understood by those of skill in the art, when a dicarboxylate of a particular metal ion is known to form a soluble chelate, rather than to form an insoluble precipitate, these dicarboxylate-metal combinations are not within the scope of the present invention, since the purpose of the precipitant is to precipitate the respective metal ion as the insoluble dicarboxylate.

In one embodiment, the onium dicarboxylate solution comprises an organic onium oxalate. In one embodiment, the onium oxalate comprises tetraalkyl ammonium oxalate. In one embodiment, the onium dicarboxylate is tetramethyl ammonium oxalate. Bis-(tetramethylammonium) oxalate, 25% aqueous solution is commercially available from SACHEM, Inc., Austin, Tex. Other onium dicarboxylates may be prepared by reaction of the appropriate onium hydroxide and dicarboxylic acid.

In one embodiment, the onium dicarboxylate solution comprises a mixture of two different onium dicarboxylates. In one embodiment, the onium dicarboxylate solution comprises a first tetraalkyl onium oxalate having small alkyl groups, e.g., all methyl or ethyl groups, and a second tetraalkyl onium oxalate having larger alkyl groups, e.g., greater than four carbon atoms, and in one embodiment, greater than eight carbon atoms. In longer-chain alkyl groups, the group may be branched or unbranched. Variations in the alkyl chain size may be used to adjust features of the resulting ceramic powder. For example, in one embodiment, using a combination of tetramethyl ammonium oxalate and tetrabutyl ammonium oxalate, a bi-modal particle size distribution may be obtained. In one such embodiment, each of the two particle size ranges in the bi-modal particle size are narrowly distributed. In one embodiment, the combination of two particle size ranges provides for improved packing of the particles and therefore a much more dense ceramic article when the ceramic powder is subsequently formed into the final ceramic article.

In one embodiment, the onium dicarboxylate precipitant solution is at a pH from about 5 to about 14, and in one embodiment from pH 7 to about pH 13, and in another embodiment from about 8 to about 12, and in one embodiment, the pH is about 9. The pH may be adjusted by addition of an onium hydroxide. In one embodiment, the pH is adjusted by use of the onium hydroxide corresponding to the onium dicarboxylate used as the precipitant. In one embodiment, a different onium hydroxide may be used to adjust the pH. For example, when a more expensive onium dicarboxylate is used, the pH can be adjusted with a more commonly available onium hydroxide, such as tetramethylammonium hydroxide. In one embodiment, a sufficient concentration of onium hydroxide is included in the precipitant solution to raise the pH of the combined metal precursor solution and precipitant solution to a pH in the range from about 11 to about 14. Obtaining this high pH helps assure that all of the metal ions are precipitated in the ceramic powder precursor.

In one embodiment, the onium dicarboxylates may generally be characterized by the formula I:

$$A_x(\text{dicarboxylate}) \tag{I}$$

wherein in formula (I), A is an onium group, the dicarboxylate anion is as defined above, and x is an integer determined by the valence of A. If A is singly charged, x=2; if A is doubly charged, x=1; if A is triply or higher charged, x and the number of oxalates or other dicarboxylate anions are modified accordingly. For example, if A is a polyonium ion containing four positive charges, two dicarboxylate anions would be present. As used herein, the onium groups are one or a combination or mixture of quaternary ammonium groups, quaternary phosphonium groups, tertiary sulfonium groups, tertiary sulfoxonium groups and imidazolium groups. A combination would be a molecule containing two onium groups, the same or different from each other, and a mixture would be two or more different onium compounds dispersed together in a single medium.

In one embodiment, the onium ions do not include ammonium ions. In another embodiment, the onium ions do not include any of ammonium ions, primary, secondary or tertiary ammonium ions. As used herein, when a solution or mixture of materials is disclosed as not including or free of or substantially free of a specified ingredient, ion or material, the specified ingredient, ion or material has not been purposefully added to the solution or mixture. It is possible that some amount of the specified ingredient, ion or material may be present as an unavoidable or unintended impurity, when the solution or mixture is specified as not including, being free or substantially free of that specified ingredient.

In one embodiment, an onium dicarboxylate is provided having very low levels of trace metal contamination. In one embodiment, the metal content of any single metal impurity is less than about 10 parts per billion (ppb) and in one embodiment, the metal content of any single metal impurity is less than about 5 ppb, and in one embodiment the metal content of any single metal impurity is less than about 1 ppb. Such low levels of metal impurities in the onium dicarboxylate may require extensive pre-treatment of the onium hydroxide or other source of the onium dicarboxylate.

In one embodiment, the onium ions which can be employed in accordance with the present invention are quaternary ammonium ions and quaternary phosphonium ions characterized by the formula II:

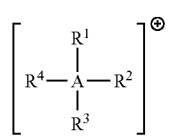

(II)

wherein in formula (II), A is a nitrogen or phosphorus atom, $R^1$, $R^2$, $R^3$ and $R^4$ are each independently alkyl groups containing from 1 to about 20, or 1 to about 10 carbon atoms, hydroxyalkyl or alkoxyalkyl groups containing from 2 to about 20, or 2 to about 10 carbon atoms, substituted or unsubstituted aryl groups or hydroxyaryl groups containing from 6 to 18 ring carbon atoms, or $R^1$ and $R^2$ or $R^3$ together with A may form a heterocyclic group provided that if the heterocyclic group contains a C=A group, $R^3$ is the second bond. In the alkoxyalkyl groups, each of the alkyl portion and the alkoxy portion may contain from 1 to about 20 carbon atoms.

The alkyl groups $R^1$-$R^4$ may be linear or branched, and specific examples of alkyl groups containing from 1 to 20 carbon atoms include methyl, ethyl, propyl, butyl, pentyl, hexyl, heptyl, octyl, isooctyl, nonyl, decyl, isodecyl, dodecyl, tridecyl, isotridecyl, hexadecyl and octadecyl groups. $R^1$, $R^2$, $R^3$ and $R^4$ also may be hydroxyalkyl groups containing from 2 to 5 carbon atoms such as hydroxyethyl and the various isomers of hydroxypropyl, hydroxybutyl, hydroxypentyl, etc. In one embodiment, $R^1$, $R^2$, $R^3$ and $R^4$ are independently alkyl and/or hydroxyalkyl groups containing 1 to about 5 carbon atoms. Specific examples of alkoxyalkyl groups include ethoxyethyl, butoxymethyl, butoxybutyl, etc. Examples of various aryl and hydroxyaryl groups include phenyl, benzyl, and equivalent groups wherein benzene rings have been substituted with one or more hydroxy groups. The aryl or hydroxyaryl groups may be substituted with, e.g., $C_1$-$C_{20}$ alkyl groups. Most often, $R^1$ to $R^4$ are lower alkyl, such as methyl.

In one embodiment, any one of the $R^1$-$R^4$ groups are alkyl and/or hydroxyalkyl groups containing from 1 to about 5 carbon atoms. Thus, in one embodiment of formula (II) in which A=N and in which the dicarboxylate is oxalate, the quaternary ammonium oxalate comprises a tetraalkylammonium oxalate. Specific examples of ammonium oxalates include tetramethylammonium oxalate (TMAO), tetraethylammonium oxalate (TEAO), tetrapropylammonium oxalate, tetrabutylammonium oxalate (TBAO), tetra-n-octylammonium oxalate, methyltriethylammonium oxalate, diethyldimethylammonium oxalate, methyltripropylammonium oxalate, methyltributylammonium oxalate, cetyltrimethylammonium oxalate, trimethylhydroxyethylammonium oxalate, trimethylmethoxyethylammonium oxalate, dimethyldihydroxyethylammonium oxalate, methyltrihydroxyethylammonium oxalate, phenyltrimethylammonium oxalate, phenyltriethylammonium oxalate, benzyltrimethylammonium oxalate, benzyltriethylammonium oxalate, dimethylpyrrolidinium oxalate, dimethylpiperidinium oxalate, diisopropylimidazolinium oxalate, N-alkylpyridinium oxalate, etc. In one embodiment, the quaternary ammonium oxalates used in accordance with this invention are TMAO and TBAO. As noted above, a suitable dicarboxylate anion may be substituted for the oxalate, to form the corresponding onium salt.

Examples of quaternary phosphonium oxalates representative of Formula (II) wherein A=P which can be employed in accordance with the present invention include tetramethylphosphonium oxalate, tetraethylphosphonium oxalate, tetrapropylphosphonium oxalate, tetrabutylphosphonium oxalate, trimethylhydroxyethylphosphonium oxalate, dimethyldihydroxyethylphosphonium oxalate, methyltrihydroxyethylphosphonium oxalate, phenyltrimethylphosphonium oxalate, phenyltriethylphosphonium oxalate and benzyltrimethylphosphonium oxalate, etc.

In another embodiment, the onium ions which can be employed in accordance with the present invention are tertiary sulfonium ions represented by the general formula III:

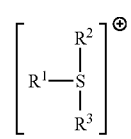

(III)

wherein in formula (III), $R^1$, $R^2$ and $R^3$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms, when substituted, said substitution comprises one or more substituent selected from any of the foregoing alkyl, hydroxyalkyl or alkoxyalkyl groups, or $R^1$ and $R^2$ or $R^3$ together with A may form a heterocyclic group provided that if the heterocyclic group contains a C=S group, $R^3$ is the second bond. In the alkoxyalkyl groups, each of the alkyl portion and the alkoxy portion may contain from 1 to about 20 carbon atoms.

In one embodiment, the $R^1$, $R^2$ and $R^3$ may be any of the optional groups disclosed above with respect to the $R^1$-$R^4$ groups for the quaternary onium embodiments.

Examples of the tertiary sulfonium oxalates represented by Formula III include trimethylsulfonium oxalate, triethylsulfonium oxalate, tripropylsulfonium oxalate, etc.

In another embodiment, the onium ions which can be employed in accordance with the present invention are tertiary sulfoxonium ions represented by the general formula IV:

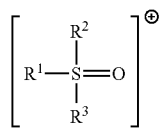

(IV)

wherein in Formula IV, $R^1$, $R^2$ and $R^3$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms, when substituted, said substitution comprises one or more substituent selected from any of the foregoing alkyl, hydroxyalkyl or alkoxyalkyl groups, or $R^1$ and $R^2$ or $R^3$ together with A may form a heterocyclic group provided that if the heterocyclic group contains a C=S group, $R^3$ is the second bond. In the alkoxyalkyl groups, each of the alkyl portion and the alkoxy portion may contain from 1 to about 20 carbon atoms.

In one embodiment, the $R^1$, $R^2$ and $R^3$ may be any of the optional groups disclosed above with respect to the $R^1$-$R^4$ groups for the quaternary onium embodiments.

Examples of the tertiary sulfoxonium ions represented by Formula IV include trimethylsulfoxonium oxalate, triethylsulfoxonium oxalate, tripropylsulfoxonium oxalate, etc. As noted above, a suitable dicarboxylate anion may be substituted for the oxalate, to form the corresponding sulfoxonium salt.

In another embodiment, the onium ions which can be employed in accordance with the present invention are imidazolium ions represented by the general formula V:

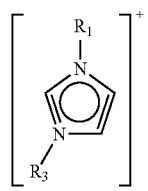

(V)

wherein in formula (V), $R^1$, $R^2$ and $R^3$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms, when substituted, said substitution comprises one or more substituent selected from any of the foregoing alkyl, hydroxyalkyl or alkoxyalkyl groups.

In one embodiment, the $R^1$ and $R^3$ may be any of the optional groups disclosed above with respect to the $R^1$-$R^4$ groups for the quaternary onium embodiments.

Examples of the imidazolium of formula (V) include, for example, dimethylimidazolium, diethylimidazolium, dibutylimidazolium, and 1-ethyl-3-methyl imidazolium, 1-butyl-3-methyl imidazolium, 1-hexyl-3-methyl imidazolium, and 1-octyl-3-methyl imidazolium.

Precursor Materials

In accordance with the present invention, the precursor materials comprise ions of one or a combination of two or more of: Mg, Ca, Sr, Ba, Al, Si, Sc, Ti, V, Cr, Mn, Fe, Co, Ni, Cu, Zn, Ga, Ge, Y, Zr, Nb, Mo, Tc, Ru, Rh, Th, Pd, Ag, Cd, In, Sn, Sb, Si, La, Hf, Ta, W, Re, Os, Ir, Pt, Tl, Pb, Bi, Ce, Pr, Nd, Pm, Sm, Eu, Gd, Dy, Er, Ho, Er, Tm, Tb, Th, Pa, U, Np and Pu as the constituent components of the target ceramic powder. These ions may be provided to the precursor solution with any appropriate counterion, provided that the ion pair is soluble in the precursor solution.

In one embodiment of the present invention, soluble chelates of the above metals are used as precursors to one or more of the constituent components of a target ceramic powder. In general, chelation is the formation or presence of bonds (or other attractive interactions) between two or more separate binding sites within the same ligand and a single central atom. A molecular entity in which there is chelation (and the corresponding chemical species) is called a chelate.

In one embodiment, one or more of the precursors are provided as soluble chelates, to improve the solubility of the metal ions, prior to the reaction with the onium dicarboxylate. A chelating agent is a polydentate ligand whose structure permits interaction of a metal ion with two or more donor sites, and a ligand is any atom, ion or molecule capable of functioning as a donor partner in one or more coordinate bonds. Suitable chelating agents, include for example, alpha-hydroxycarboxylic acids, such as lactic acid, glycolic acid, malic acid and citric acid, or alphamino-carboxylic acids such as ethylenediamine tetraacetic acid (EDTA) and glycine. For example, to prepare a barium-calcium-yttrium-manganese-zirconium-titanate, a solution of the precursors: $Ba(NO_3)_2$, $Ca(NO_3)_2.4H_2O$, $Nd(NO_3)_3.6H_2O$, $Y(NO_3)_3.4H_2O$, $Mn(CH_3COO)_2.4H_2O$, $ZrO(NO_3)_2$, and $[CH_3CH(O^-)COONH_4]_2Ti(OH)_2$, is formed in deionized water. In this example, the soluble titanium chelate $[CH_3CH(O^-)COONH_4]_2Ti(OH)_2$ is used due to the otherwise difficult solubility of the titanium.

Although the wide variety of metal ions to which the invention is applicable present a wide range of solubilities, the person of skill in the art can readily determine appropriate counterions and/or chelates for use in the present invention. One significant criterion for such selection is that the counterion and/or chelating agent should be amenable to thermal decomposition in air during the calcining step so to leave no residue in the ceramic powder thus formed.

Processes

In one embodiment, a suitable temperature range for the formation of aqueous-solution oxalate precipitated powders is 35° C. to 110° C., and in another embodiment from about 65° C. to about 95° C. In one embodiment, a suitable temperature range for the formation of aqueous-solution oxalate precipitated powders is 85° C. to 90° C.

The processes and techniques described in the present application can be utilized to prepare numerous different types of mixed metal oxides (ceramic powder precursors) and ceramic powders, as will be understood to those skilled in the art. Thus, although the present application emphasizes the use of these processes and techniques in the fabrication of ceramic powders for use in electrical energy storage devices (e.g., doped or composition-modified barium titanate), and as Hi-K dielectric materials for use in semiconductor applications, the same or similar techniques and processes can be used to prepare other metal oxide and ceramic powders, and those metal oxide and ceramic powders may find application in the manufacture of various components, devices, materials, etc., that include ceramic powder-based parts.

Metal oxalates are generally insoluble, and the metal oxalate particles are generally readily filtered from the liquid in which they are formed and are easy to handle. For example, oxalates of the following compounds are known to exhibit low water solubility: Al, Ba, Bi, Cd, Ca, Ce(III), Cr(II), Co, Cu, the rare earths, Ga, Fe(II), Pb, Mg, Mn, Hg, Ni, Ag, Sr, Tl(I), Th, U, Y, and Zn. Although not every combination has been tested, it is believed that the metals disclosed herein that form oxalates (as opposed to hydroxides at high pH) have very low solubilities, and thus will form the desired ceramic powder precursor.

In wet-chemical methods for the preparation of ceramic powder precursors by co-precipitation of a mixture of precursors from solution, small amounts of precipitant and water will typically be included within the micropores and nanopores of the product precipitate. Similarly, small amounts of precipitant and water will also be adsorbed onto the surface of the precipitate product. During calcination in air of the product precipitate, about half of the oxygen of the oxalate anion in its thermal decomposition becomes part of a mixed oxide compound and the other half with all the carbon is converted by oxidation to carbon dioxide gas. The various residuals are thermally decomposed and oxidized and thereby completely converted to gaseous products such as $H_2O$, $NH_3$, $CO$, $CO_2$, $N_2$, $N_2O$, $NO$, and $NO_2$, $SO_2$, or a phosphorus oxide. The same decomposition generally applies to any 2-hydroxycarboxylic acid or other organic compound that may be selected as a solubilizing chelating agent, as described below.

In one embodiment, no washing of the precipitated powder is needed to remove residual precipitant because the onium oxalate residuals, and other residuals, are completely volatilized away in the calcining step. However, in some embodiments, a deionized (DI) or distilled water washing step, or some other washing step, is performed. Thus, by use of the nonmetal-ion-containing onium dicarboxylate, an aqueous solution of water-soluble hydrated and chelated metal-ion species in their proportional amounts is precipitated as a dicarboxylate, e.g., as an oxalate, and by calcination in air converted to the corresponding metal oxide. The combined ceramic powder precursors thus form the desired ceramic powder.

Preparation of the high-permittivity calcined ceramic powder precursor into a ceramic powder in this manner yields a high-purity ceramic powder having improved properties such as one or more of improved particle size distribution, reduced particle size, reduced metal impurities and improved particle morphology, compositional homogeneity, controllable stoichiometry, re-dispersability and chemical stability, as compared to an otherwise identical ceramic powder made by a process not including the onium dicarboxylate as precipitant. The microstructures of ceramics formed from these calcined wet-chemical-prepared ceramic powder precursors are uniform in grain size and can also benefit from the smaller grain size. As a result of these improved characteristics of the ceramic powder, electrical properties can be improved so that higher relative permittivities and increased dielectric breakdown strengths can be obtained in the articles made using the ceramic powder of the present invention. Further improvement can be obtained by the elimination of voids within the sintered ceramic body with subsequent hot isostatic pressing, if needed. In one embodiment, since the present invention provides for production of ceramic powders having particle sizes on a nanometer scale, such isostatic pressing is not required to obtain the desired electrical properties in the final ceramic product.

In one exemplary embodiment, the solution of precursor metals can be mixed and/or heated (e.g., heated to 80° C.). The precursor metals are provided in the proportionate amount in weight percent for each of the desired ceramic powder precursors.

A separate solution of a suitable onium dicarboxylate, somewhat in excess of the amount required to equate the amount of metal ion in the precursor metal solution, in one exemplary embodiment, is made in deionized water and heated to 85°-90° C.

In one embodiment, the two solutions are mixed by pumping the heated ingredient streams simultaneously through a coaxial fluid jet mixer. A slurry of the co-precipitated ceramic powder precursor is produced and filtered, optionally deionized-water washed, and dried. Alternatively, the ceramic powder precursor can be collected by centrifugal sedimentation, or some other technique. The ceramic powder precursor is calcined under suitable conditions, e.g., at a temperature in the range from about 200° C. to about 1500° C. in air in an appropriate silica glass (fused quartz) tray or tube, for a period ranging from about 1 minute to about 24 hours, to form the ceramic powder. Calcining in air improves the rate of decomposition of the non-metals (e.g., C, H, N, O, S, P, etc.).

In one embodiment, the ceramic powder precursor is calcined at a temperature in the range from about 400° C. to about 1350° C. for a period ranging from about 30 minutes to about 24 hours. In one embodiment, the ceramic powder precursor is calcined at a temperature in the range from about 600° C. to about 1200° C. In one embodiment, the ceramic powder precursor is calcined at a temperature greater than 800° C. It is noted that the calcining should be carried out at a temperature sufficient to decompose the metal oxalates and any metal hydroxides in the ceramic powder precursor, but should not be so high as to fuse the ceramic powder particles together. Thus, the calcining temperature should be in a range from slightly greater than the minimum needed to decompose the ceramic powder precursor into ceramic powder to less than the temperature at which the resulting ceramic powder particles fuse together, as would take place in a subsequent step of sintering. The times and/or temperatures of calcining may be suitably adjusted as needed to obtain complete removal of non-metals, complete conversion of the metal oxalates and any metal hydroxides to metal oxides, and to obtain complete reaction between the metal oxides of which the ceramic powder is comprised. Those of skill in the art can readily determine appropriate times for the calcining.

In one embodiment, the ceramic powder obtained from the calcining step is subsequently sintered to form a ceramic article or structure on a substrate. As known in the art, prior to sintering, a suitably molded or formed green body may be formed, having a size, shape and/or structure as appropriate to the desired ceramic article of structure. In one embodiment, the sintering is carried out at a temperature in the range from about 1000° C. to about 3000° C. In one embodiment, the sintering is carried out at a temperature in the range from about 1500° C. to about 2500° C. The sintering may be carried out for an appropriate period of time, for example, for a time in the range from about 1 minute to about 24 hours. The time for sintering can be readily determined by those of skill in the art, based on the materials to be sintered and the intended product of the sintering.

In one embodiment, the product is used in fabrication of an electrical energy storage unit, such as disclosed in U.S. Pat. No. 7,033,406 B2, which includes description of how a ceramic powder such as that obtained in accordance with the present invention, may be used in an electrical energy storage unit. The disclosure of U.S. Pat. No. 7,033,406 B2, to which reference may be had for further details, and which is hereby incorporated herein by reference in its entirety, in particular for its teachings relating to fabrication of an electrical energy storage unit.

FIG. 1 is a flow chart illustrating ceramic powder processing techniques in accordance with the present invention. The process begins at step 100. In step 110, the appropriate precursor materials, e.g., soluble chelates and other precursors, are provided in solution. Next, in step 120, the onium dicarboxylate precipitant is provided. The two materials are then combined in step 130 to form the desired ceramic powder precursor via a co-precipitation reaction. Once the ceramic powder precursor is formed, it can be separated from the solution in which it is formed using suitable separation devices and techniques, in step 140. Other post-precipitation steps can be employed including: optionally washing the ceramic powder precursor as in step 150, optionally drying the ceramic powder precursor in step 160 (which may be done whether or not the optional washing step 150 is carried out), and calcining the ceramic powder precursor as shown in step 170, to form the ceramic powder. The process of forming the ceramic powder is complete when the step 170 is completed. In one embodiment, the ceramic powder is thereafter formed into a green body (not shown) and then sintered to form a ceramic article, as in step 180. The process terminates at step 190.

In one embodiment, the two ingredient streams, one containing the aqueous solution of all the metal-ion compound precursors and the other containing the aqueous solution of the onium dicarboxylate, are reacted together simultaneously and continuously in a fluid jet column that provides a high turbulence energy environment. The ingredient streams can be heated, for example, to a temperature in the range from about 65° C. to about 110° C., and in one embodiment, about 85° C. The total volume for the saturated or near-saturated commercially available and specially manufactured aqueous solutions of the precursors is typically larger than that of the onium dicarboxylate in aqueous solution. There are generally two options in this case for the jet fluid column: (1) adjust the former to a flow rate proportionally larger than that of the latter, keeping the stream velocities equal by having the applied driving pressure to the two streams the same, but with the cross-sectional area of the nozzle of the former proportionally larger than that of the latter; and (2) dilute one volume of the latter by a proportional volume of DI water, thereby lowering the concentration of the precipitant. With equal volumes for both streams, the nozzles are alike, the flow rates are equal, and the applied driving pressure is the same. The amount of liquid processed is generally greater than that of the first option, however. The first has the substantial advantage of minimizing the amount of liquid handling and the usage of DI water. Examples of such fluid jet column mixing techniques are described in U.S. Pat. No. 5,087,437. U.S. Pat. No. 5,087,437, to which reference may be had for further details, and which is hereby incorporated by reference herein in its entirety, particularly for its teachings relating to fluid jet column mixing techniques.

In other embodiments, other techniques and devices can be used to combine the ingredient streams such as, for example: (1) pouring one solution in one vessel into the other solution in another vessel and using mechanical or ultrasonic mixing, and (2) metering the solution in one vessel at some given flow rate into the other solution in another vessel and using mechanical or ultrasonic mixing. Numerous other mixing techniques will be known to those skilled in the art.

The present invention provides a significant advantage over prior processes for co-precipitation. For example, where a strong base hydroxide alone is used as the precipitant, gelatinous amorphous hydrated hydroxides result. These precipitates can be difficult to filter, e.g., clogging filter cartridges, but also require a lengthy reflux time in the mother liquid, typically at 93° C. at atmospheric pressure for 8 to 12 hours, to densify and transform to the crystalline state.

Such issues pertaining to the use of a strong base hydroxide or ammonium oxalate as the precipitant can be circumvented by the choice of an onium dicarboxylate as the precipitant in accordance with the present invention. As a precipitant, the onium dicarboxylate has the advantage of being thermally decomposed and oxidized away by conversion to gaseous products during the calcination-in-air step of the ceramic powder precursor.

Unlike hydrated hydroxide precipitates, the oxalate precipitates of the present invention, i.e., the ceramic powder precursor, are substantially crystalline when formed at, for example, 85° C. in aqueous solution at atmospheric pressure, are readily filterable, are easily and quickly dried in an oven at, for example, 85° C., and are then converted to the desired oxide (or mixed oxide) ceramic powder by calcination in air in a furnace silica glass (fused quartz) tube from ambient to approximately 1500° C., in one embodiment are calcined at about 800° C. These temperatures are examples, and similar results may be achievable with somewhat lower temperatures. In one embodiment, to avoid unwanted decomposition of the dicarboxylate co-precipitate during subsequent oven drying thereof, a temperature of about 100® C. to about 160° C. is adequate, and considerably higher temperatures should be avoided. In one embodiment, the drying temperature is maintained at about 85-90° C., and in another embodiment, the drying temperature is about 120° C.

Unlike the alkali metal hydroxides, the onium dicarboxylates of the present invention do not result in contamination of the powder product with difficult to remove metal ions, such as sodium ions or potassium ions.

Unlike the ammonium oxalate process, when the onium dicarboxylates in accordance with the present invention are used, adjustment of the pH to the desired high range, and maintenance of a steady, consistent pH is facilitated, and the results obtained are far superior. When ammonium ion is used, ammonia can be lost from the solution by evaporation, thus causing drifting variations in the solution pH which must be monitored frequently and compensated regularly to maintain a desired pH. In addition, the evaporated ammonia makes an offensive odor and poses an additional environmental problem. Such problems do not occur with the onium-based solutions, using, e.g., an onium hydroxide to adjust pH in which the onium ion corresponds to that used in the onium dicarboxylate.

An important feature of the present invention is that the process disclosed provides for the formation of ceramic powders having a single perovskite phase, in which the composition contains a single compound in a perovskite phase (e.g., $Ba_xSr_{(1-x)}TiO_3$), as opposed to a mixture of compounds containing the individual ingredients or mixtures of less than all in a single compound (e.g., a mixture of $BaTiO_3$ and $SrTiO_3$)

which, when calcined, may give a ceramic powder, but not that desired and obtainable by the present invention.

The onium dicarboxylates of the present invention are generally more soluble than prior art compounds such as ammonium oxalate, which is less soluble in water. For example, the solubility of ammonium oxalate at 20° C. is about 0.3586 M, or about 4.25% in water. By contrast, the solubility of tetramethylammonium oxalate at 20° C. is about 2.65 M, or about 62.6% in water. This higher solubility of the onium dicarboxylate provides the capability of working in more concentrated solutions, and thus producing less waste.

When the co-precipitation reaction is performed, with the use of the above-described onium dicarboxylate solution as the precipitant, in one embodiment, the powder particle size distribution range is reduced by about 40% or more over that of previous efforts, and the powder is free flowing. The free-flowing powder characteristics are observed by motion of the powder in a transparent plastic or glass container. In one embodiment, the powder particle size is significantly reduced and the particles are more uniform in shape. In one embodiment, the powder particle size is reduced by about 40% or more over that of previous efforts. As a result of using highly purified, low-metal onium dicarboxylates, the metal ion contamination levels in the resulting powders are much reduced.

Thus, the resulting slurry is transferred from the mixing vessel to a filtration or separation device. The separating of the precipitate from the liquid phase and the isolation of precipitate can be carried out using a variety of devices and techniques including: conventional filtering, vacuum filtering, centrifugal separation, sedimentation, spray drying, freeze drying, or the like. The filtered powder can then undergo various washing, drying, and calcining steps as desired.

In one embodiment, the process in accordance with the present invention may be applied to the preparation of a ceramic powder for use as a dielectric. In one exemplary embodiment, the ceramic powder comprises a doped barium-calcium-zirconium-titanate. In one embodiment, the doped barium-calcium-zirconium-titanate comprises a composition having a general formula VI:

$$(Ba_{1-\alpha-\mu-\nu}A_\mu D_\nu Ca_\alpha)[Ti_{1-\chi-\delta-\mu'-\nu'}Mn_\delta A'_{\mu'}D'_{\nu'}Zr_\chi]_z O_3 \quad (VI)$$

wherein in formula (VI), A=Ag, A'=Dy, Er, Ho, Y, Yb or Ga; D=Nd, Pr, Sm, or Gd; D'=Nb or Mo; $0.10 \leq \chi \leq 0.25$; $0 \leq \mu \leq 0.01$; $0 \leq \mu' \leq 0.01$; $0 \leq \nu \leq 0.01$; $0 \leq \nu' \leq 0.01$; $0 \leq \delta \leq 0.01$; $0.995 \leq z \leq 1$; and $0 \leq \alpha \leq 0.005$, as disclosed in U.S. Pat. No. 6,078,494, to which reference may be had for further details, the entirety of which is incorporated herein by reference. This patent contains teachings relating to the use of such ceramic powders as dielectric materials to form multilayer capacitors.

In one embodiment, the process in accordance with the present invention may be applied to the preparation of high-K dielectric materials from the ceramic powders. A variety of high-K dielectric materials may be prepared according to the present invention, including, for example, zirconium silicate, hafnium silicate, lanthanum oxide, $La_2O_3$, hafnium oxide, $HfO_2$, zirconium oxide, $ZrO_2$, cerium oxide, $CeO_2$, bismuth silicon oxide, $Bi_4Si_2O_{12}$, titanium dioxide, $TiO_2$, tantalum oxide, $Ta_2O_5$, tungsten oxide, $WO_3$, yttrium oxide, $Y_2O_3$, $LaAlO_3$, BST ($Ba_{1-x}Sr_xTiO_3$), $PbTiO_3$, $BaTiO_3$, $SiTiO_3$, $PbZrO_3$, PST ($PbSc_xTa_{1-x}O_3$), PZN ($PbZn_xNb_{1-x}O_3$), PZT ($PbZr_xTi_{1-x}O_3$), PMN ($PbMg_xNb_{1-x}O_3$) and mixtures and combinations thereof. By mixtures and combinations, it is contemplated that the precursors may be combined and co-precipitated to provide a ceramic powder precursor used to produce the ceramic powders used in any two or more of the foregoing high-K dielectric materials. In addition to the foregoing high-K dielectric materials, other dielectric materials may be combined in any combination with any of the foregoing. Such other dielectric materials may include, for example, one or more of silicon dioxide, silicon nitride, silicon oxynitride and aluminum oxide. The foregoing high-K dielectric materials and combinations thereof, may be used, for example, in semiconductor devices as insulating layers, e.g., as gate oxides, etc. It is noted that the foregoing materials are referred to as high-K dielectric materials, but that these materials have a variety of uses and the disclosure herein is not limited to use of these materials as high-K dielectric materials, but may also relate to other uses.

In one embodiment, the process in accordance with the present invention may be used to prepare ceramic powders such as $SrBi_2Ta_2O_9$.

In one embodiment, the process in accordance with the present invention may be used to prepare ceramic powders having a general formula:

$$(Ln_a X_b)_e (Z^1{}_c Z^2{}_d)_f O_g$$

wherein Ln is selected from Y, La and a Lanthanide series element, or a combination of these and X also represents an element occupying the A site of a perovskite oxide and is selected from Sr, Ca and Ba, and $Z^1$ and $Z^2$ represent different elements occupying the B site of a perovskite oxide and are selected from Cr, Mn, Mg and Fe, and wherein a has a value from 0 to 1, preferably, 0.7 to 1.0, b has a value of from 1 to 0, preferably 0.3 to 0, and each of c and d has a value of from 0.25 to 0.75, provided that a+b has a value of 1, and c+d, has a value of 1, and wherein e has a value of from 0.8 to 1, wherein f has a value of from 0.8 to 1, and g has a value of from 2.5 to 3.2, as disclosed in U.S. Pat. No. 7,504,172 B2.

In one embodiment, the process in accordance with the present invention may be used to prepare ceramic powders which are ferroelectric materials having a perovskite crystal structure and having a generalized formula $ABO_3$, and exemplified by the lead zirconate titanate $[Pb(Zr_{1-x}Ti_x)O_3$ (PZT) family, such as disclosed in U.S. Pat. No. 5,908,802, to which reference may be had for further details, the entirety of which is incorporated herein by reference. This patent contains teachings relating to the use of such ferroelectric materials to form devices including the ferroelectric ceramic materials. As known, PT, lead titanate, is also a ferroelectric material. Various cations can be substituted for elements in the PZT precursor material to form other ferroelectric materials. Lanthanum and barium, A-site cations, can be substituted for lead, another A-site cation. Niobium, bismuth, magnesium, copper, and tin can substitute for either of the B-site cations zirconium or titanium. Therefore, for example, lanthanum or barium can be added to produce PLZT or PBZT, respectively. Niobium can be added to the general PZT precursor material to form a PNZT precursor material. Alternatively, tin, bismuth, magnesium, and copper can be added to a PZT precursor material. In accordance with the process of the present invention, any combination of the described metal cations can be substituted for lead, zirconium, and titanium to produce a ferroelectric material in the form of a ceramic powder.

In one embodiment, the process in accordance with the present invention may be used to prepare perovskite complex oxides containing one or more rare earth element species and one or more transition metal elements, having a general formula $RTO_3$, as disclosed in U.S. Patent Application Publication No. 2006/0018815, to which reference may be had for further details, the entirety of which is incorporated herein by reference. This patent contains teachings relating to the use of such perovskite complex oxides. For example, in one embodiment, in the general formula $RTO_3$ of perovskite complex oxides, R may be comprised of one or more rare earth element species and T may be comprised of one or more transition metal elements. In other embodiments, R can be comprised of one or more rare earth element species and one or more members selected from the group comprising alkali metal elements and alkali earth metal elements and T can be comprised of one or more transition metal elements. The rare earth element species of which R is comprised can be, but is not particularly limited to, Y, La, Ce, Nd, Sm, Pr or the like, and combinations thereof. The transition metal element species of which T is comprised can be, but is not particularly limited to, Co, Fe, Ni, Mn, Cu, Cr, V, Nb, Ti, Zr, Pt, Pd, Ru, Rh, Au, Ag or the like, and combinations thereof. As elements other than rare earth element species that can constitute R can be exemplified alkali metal elements and alkali earth metal elements contained in the manner of partially replacing the rare earth element species. Such elements include Li, K, Na, Mg, Sr, Ca, Ba and combinations thereof.

In one embodiment, the atoms useful are those in $ABO_x$ perovskite materials, in which the B site may be one or more of Ti, Zr, Hf, Ta, Nb, Mo, W, V or P, and in which the corresponding $BO_x$ may be referred to as titanates, zirconates, hafnates, tantalates, niobates, molybdates, tungstates, vanadates, stannates and phosphates. While it is recognized that P is not a metal, phosphates can be used in accordance with the present invention, analogous to a $BO_x$ ion.

In one embodiment, the process in accordance with the present invention may be used to prepare actinide oxides, in particular uranium and plutonium for use in nuclear reactors, as disclosed in U.S. Pat. No. 7,169,370, which contains teachings relating to the obtaining of co-precipitated actinides, particularly in oxidation state (IV). U.S. Pat. No. 7,169,370, to which reference may be had for further details, and which is hereby incorporated herein by reference for its teachings relating to co-precipitating actinides.

In one embodiment, the process in accordance with the present invention may be used to prepare strontium bismuth niobium tantalate having an empirical formula:

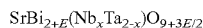

$$SrBi_{2+E}(Nb_xTa_{2-x})O_{9+3E/2}$$

wherein E is a number representing a stoichiometric excess amount of bismuth ranging from zero to 2; x is a number representing an amount of niobium ranging from 0.01 to 0.9. In one embodiment, X ranges from 0.4 to 0.8, and in another embodiment, X ranges from 0.5 to 0.6, and in one embodiment is 0.56. E can range from zero to 2, and in one embodiment is in the range from 0.1 to 0.3, and in one embodiment is 0.18. These compounds are disclosed more fully in U.S. Pat. No. 5,784,310, to which reference may be had for further details, and which is incorporated herein by reference for its teachings relating to such compounds and preparation thereof.

In one embodiment, the process in accordance with the present invention may be used to prepare Olivine-type $LiFePO_4$, which may be doped with small amounts of ions such as $Mg^{2+}$, $Cu^{2+}$ and $Zn^{2+}$ to improve electrical conductivity. Such compounds recently have been identified as a material possibly suitable for use as an electrode material for a lithium ion battery.

In one embodiment, the process in accordance with the present invention may be used to prepare intercalation compounds such as $LiMn_2O_4$ and $LiCoO_2$, for use in secondary lithium ion batteries.

In another embodiment, a process in accordance with the present invention may be employed to prepare oxides having a formula:

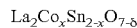

$$La_2Co_xSn_{2-x}O_{7-\delta}$$

in which x ranges from about 0.05 to about 0.5 and δ reflects the difference in stoichiometry resulting from the Co doping level. Such compounds are disclosed in Cheng et al., "Catalytic combustion of methane over cobalt doped lanthanum stannate pyrochlore oxide", Catalysis Communications, Vol. 9, Issue 5, 20 Mar. 2008, pp 690-695.

As disclosed herein, a process in accordance with the present invention can be employed to provide a wide variety of ceramic powders having improved properties such as one or more of improved particle size distribution, reduced particle size, reduced metal impurities and improved particle morphology, improved compositional homogeneity, improved control of stoichiometry, improved re-dispersability and enhanced chemical stability, as compared to ceramic powders made by prior art processes.

The finer each powder in the mixture is, the higher the particle surface-to-volume ratio is for each. This means that there is a greater surface area per unit weight of each powder for the solid-solid diffusion to occur. Moreover, longer times spent at high temperature (e.g., the calcining temperature) produce a more satisfactory end product.

Preparation of the ceramic powder as described herein yields high purity powders with narrow particle-size distribution and smaller grain size. The microstructures of ceramics formed from these calcined wet-chemical-prepared powders are uniform in grain size. Electrical properties of the ceramic articles produced using these ceramic powders are improved so that higher relative permittivities and increased dielectric breakdown strengths can be obtained.

The particle sizes and the particle size distribution of the ceramic powder product may be determined by a suitable procedure, such as by a laser granulometer. A suitable laser granulometer is the Coulter™ LS230 Laser Granulometer. This instrument can measure particle sizes down to about 0.04 µm (40 nm). Smaller particle sizes may be determined by use of scanning electron microscopy (SEM).

In one embodiment, when the ceramic powder made in accordance with the present invention is used as a dielectric material, the dielectric material exhibits a substantially improved dielectric breakdown voltage. A suitable method for testing the dielectric breakdown voltage is ASTM D149-97a (2004), "Standard Test Method for Dielectric Breakdown Voltage and Dielectric Strength of Solid Electrical Insulating Materials at Commercial Power Frequencies". It is considered that the improved dielectric breakdown voltage results from one or more of the reduced contamination by alkali metal ions, from the reduced particle sizes obtained, from the improved and significantly reduced particle size distribution, and/or from the improved purity attainable by the use of the highly purified onium oxalate, such as the tetramethylammonium oxalate available from SACHEM, Inc.

In one embodiment, the ceramic powder precursor made in accordance with the present invention is not milled prior to calcining to form the ceramic powder. In one embodiment, the ceramic powder made in accordance with the present invention is not milled prior to sintering the ceramic powder to form a ceramic article. As is known, milling operations, such as ball milling, can result in contamination of the ceramic powder precursor and/or the ceramic powder with the materials of which the mill is made, thereby increasing contamination in the end ceramic article.

EXAMPLE AND COMPARATIVE EXAMPLE

Barium-Strontium Titanate (BST) Powders Prepared by Precipitation of Barium-Strontium Titanyl Oxalate Using Tetramethylammonium Oxalate (Example 1) versus Ammonium Oxalate (Comparative Example 1) as Precipitant An aqueous solution is prepared containing 0.060 M barium nitrate, 0.040 M strontium nitrate, and 0.10 M dihydroxybis(ammonium lactato) titanium (IV). This stock solution of soluble barium, strontium and titanium salts is "Solution A" used for both Example 1 and Comparative Example 1.

Example 1

Preparation of BST Powder ($Ba_{0.6}Sr_{0.4}TiO_3$) Using Tetramethylammonium Oxalate as Precipitant An aqueous solution of 0.25 M tetramethylammonium oxalate is prepared. The pH of this solution is adjusted to 9.2 using an aqueous solution of 10% tetramethylammonium hydroxide. This is "Solution B1".

1,000 grams of Solution B1 (0.25 Molar tetramethylammonium oxalate) is weighed into a 4-liter Pyrex® beaker. The beaker is placed on a hot plate fitted with a temperature probe for temperature control, and both a temperature probe and a pH probe are placed in the solution. A Teflon® polymer coated mechanical stirring blade is placed in the center of the solution, approximately one centimeter above the bottom of the beaker.

1,000 grams of Solution A (described above) is weighed into a 2-liter Teflon® separatory funnel. The funnel is placed in a ring stand with the tip of the funnel positioned above the surface of Solution B1 in the Pyrex® beaker.

This solution is heated to 80° C., with the mechanical stirrer set to 500 RPM. Solution A is added from the separatory funnel at a rate of approximately one drop per second. The pH of the solution is periodically adjusted to maintain pH 9.0 throughout the addition of Solution A, by addition of an aqueous solution of 10% tetramethylammonium hydroxide. A white precipitate begins to form almost immediately after the addition of Solution A has begun. The addition of Solution A to Solution B1 is complete after one hour and twenty minutes. This mixture is allowed to digest an additional one-half hour at 80° C. with stirring. At the end of the one-half hour digestion, the hot plate is turned off, and the mixture allowed to cool to room temperature, and the stirrer is turned off. The beaker is covered with Parafilm® and allowed to stand undisturbed for two days. After two days, the white precipitate is resuspended, and this slurry is stored in a one-gallon polyethylene jug. The final pH of this slurry is 9.13.

Portions of this slurry are weighed into centrifuge tubes and centrifuged for one hour. The resulting supernatant is then filtered through a 0.2 micron polypropylene syringe filter. This supernatant was saved for analysis. The solid cakes from the centrifuge tubes are dried overnight in a forced-draft oven at 120° C. A portion of this dry barium-strontium titanyl oxalate (BSTO) precursor is saved for further characterization.

The remaining BSTO powder is placed in a Thermolyne model 47900 electric furnace and heated at 800° C. for four hours. The resulting barium-strontium titanate (BST) powder is allowed to cool overnight and then bottled for characterization.

Comparative Example 1

An aqueous solution of 0.25 M ammonium oxalate is prepared. The pH of this solution is adjusted to 9.2 using 28-30% ammonium hydroxide solution. This is "Solution B2".

1,000 grams of Solution B2 (0.25 M ammonium oxalate) is weighed into a 4-liter Pyrex beaker. This beaker is placed on a hot plate fitted with a temperature probe for temperature control. A temperature probe and a pH probe are placed in the solution. A Teflon polymer-coated mechanical stirring blade is placed in the center of the solution, approximately one centimeter above the bottom of the solution. The pH of the solution immediately begins to drop, prior to addition of any Solution A, and the odor of ammonia is apparent; these effects are due to evaporation of ammonia from the solution.

1,000 grams of Solution A is weighed into a 2-liter Teflon® separatory funnel. The funnel is placed in a ring stand with the tip of the funnel positioned above the surface of Solution B2 in the Pyrex® beaker.

This solution is heated to 80° C., with the mechanical stirrer set to 500 RPM. The pH of this solution is adjusted to 9.0 using an aqueous solution of 28-30% ammonium hydroxide. Solution A is added from the separatory funnel at a rate of approximately one drop per second. The pH of the solution is periodically adjusted to maintain pH 9.0 throughout the addition of Solution A (due to loss of ammonia, this addition is needed more frequently than with the TMAH used in Example 1). A white precipitate begins to form almost immediately after the addition of Solution A begins. The addition of Solution A to Solution B2 is complete after about one hour. This mixture is allowed to digest an additional one-half hour at 80° C. with stirring. At the end of the one-half hour digestion, the hot plate is turned off, and the mixture allowed to cool to room temperature, and the stirrer is turned off. The beaker is covered with Parafilm® and allowed to sit undisturbed for two days. After two days, the white precipitate is resuspended, and this slurry is stored in a one-gallon polyethylene jug. The final pH of this slurry is 9.07.

Portions of this slurry are weighed into centrifuge tubes and centrifuged for one hour. The resulting supernatant is filtered through a 0.2 micron polypropylene syringe filter and saved for analysis. The solids cakes from the centrifuge tubes are dried overnight in a forced-draft oven at 120° C. A portion of this dry barium-strontium titanyl oxalate (BSTO) precursor is saved for further characterization. The remaining BSTO powder is placed in a Thermolyne® model 47900 electric furnace and heated at 800° C. for four hours. The resulting barium-strontium titanate (BST) powder is allowed to cool overnight and then bottled for characterization.

The products of obtained from Example 1 and Comparative Example 1 are analyzed. The results are provided in the following.

X-Ray Diffraction of the Barium Strontium Titanate (BST) Powders from Example 1 and Comparative Example 1

Figure 2:
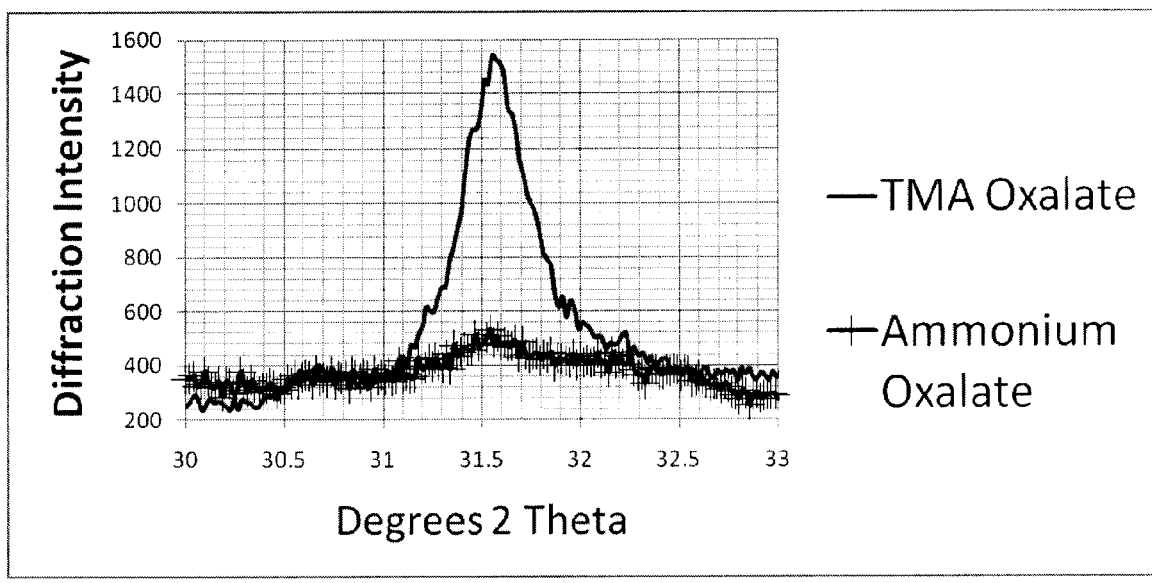
FIG. 2 is a X-ray diffraction scan showing diffraction intensity at 30-33 degrees 2 theta for precipitates made in accordance with the present invention and with the prior art.

FIG. 2 is a X-ray diffraction scan showing diffraction intensity at 30-33 degrees 2 theta for precipitates made in accordance with the present invention and with the prior art. FIG. 2 depicts the X-Ray Diffraction patterns for the 110 reflection in the region of 30-33 Degrees 2 Theta, for a sample of $Ba_xSr_{(1-x)}TiO_3$ prepared in Example 1, in accordance with the present invention, and for a sample of $Ba_xSr_{(1-x)}TiO_3$ prepared in Comparative Example 1, according to the prior art. As shown in FIG. 2, the Example 1, when TMA Oxalate is used in the preparation in accordance with an embodiment of the present invention, the X-ray diffraction shows a single diffraction peak for the 110 reflection from $Ba_xSr_{(1-x)}TiO_3$ in the diffraction pattern for the titanate. This is consistent with a single phase (Ba,Sr) titanate with a composition of approximately $Ba_{0.85}Sr_{0.15}TiO_3$ according to Roeder et al. (J. Am. Ceram Soc 82 [7] 1665-75 (1999). As noted in Roeder et al., a pure $BaTiO_3$ phase would have a peak maximum at 31.49 degrees (2 Theta), and a pure $SrTiO_3$ phase would have a peak maximum at 32.3 degrees. No evidence of such peaks are observed in the (Ba,Sr) titanate prepared in Example 1. This suggests that the TMA oxalate precipitation has been successful in combining the Ba, Sr and Ti in a single perovskite phase. As shown in FIG. 2, when prepared from ammonium oxalate in Comparative Example 1, in accordance with the prior art, the X-ray diffraction shows only a trace of the perovskite phase. This indicates that in the prior art process, very little, if any, of the perovskite phase containing "true" barium strontium titanate would be obtained. This is in sharp contrast to the process of Example 1, in accordance with the present invention, in which an X-ray diffraction pattern consistent with a single perovskite phase of $Ba_xSr_{(1-x)}TiO_3$ is observed.

Particle Size Distributions of the Barium-Strontium Titanyl Oxalate (BSTO) Precursors from Example 1 and Comparative Example 1

Figure 3:
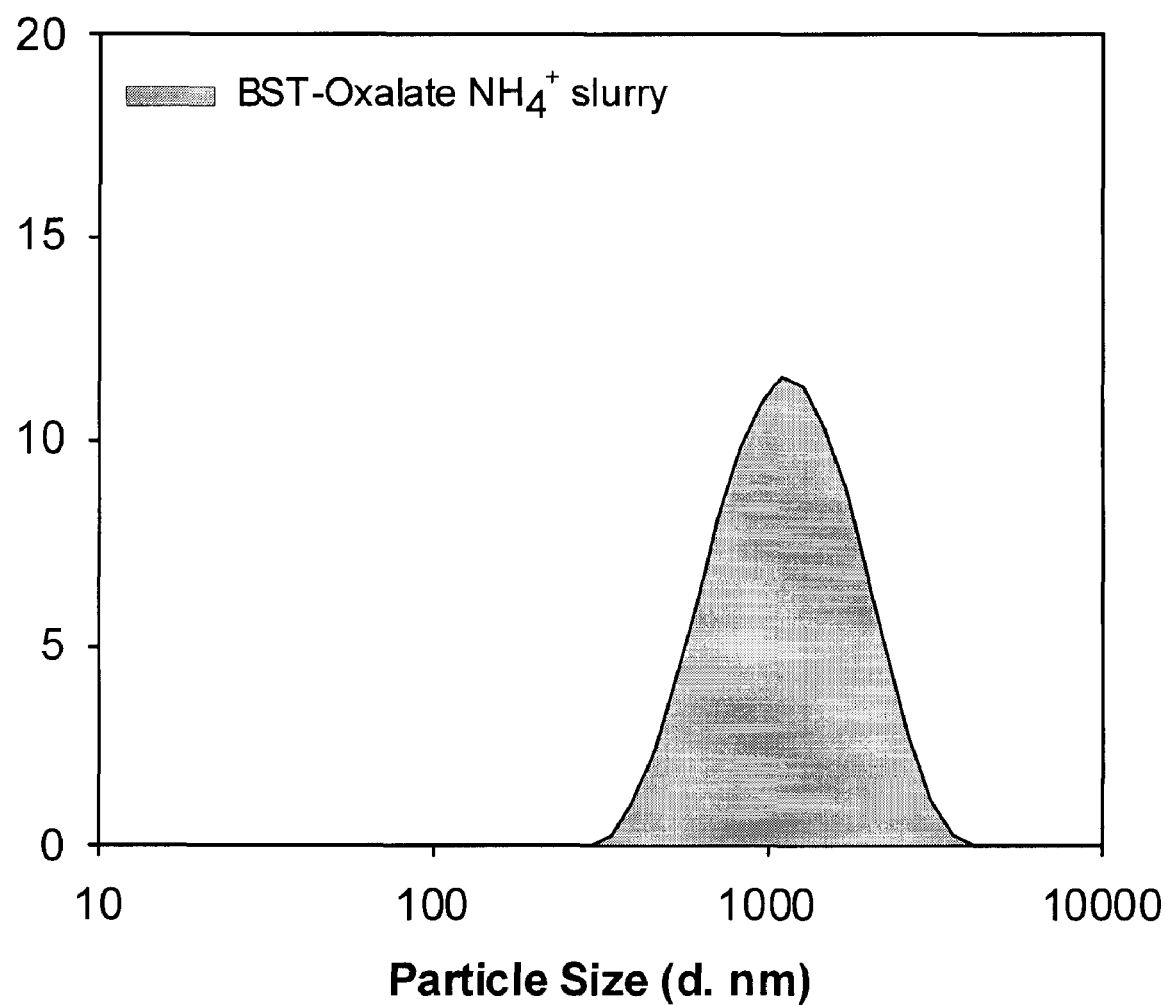
FIGS. 3 and 4 are graphs showing the average particle size and particle size range distribution for precipitates made in accordance with the present invention and with the prior art.
Figure 4:
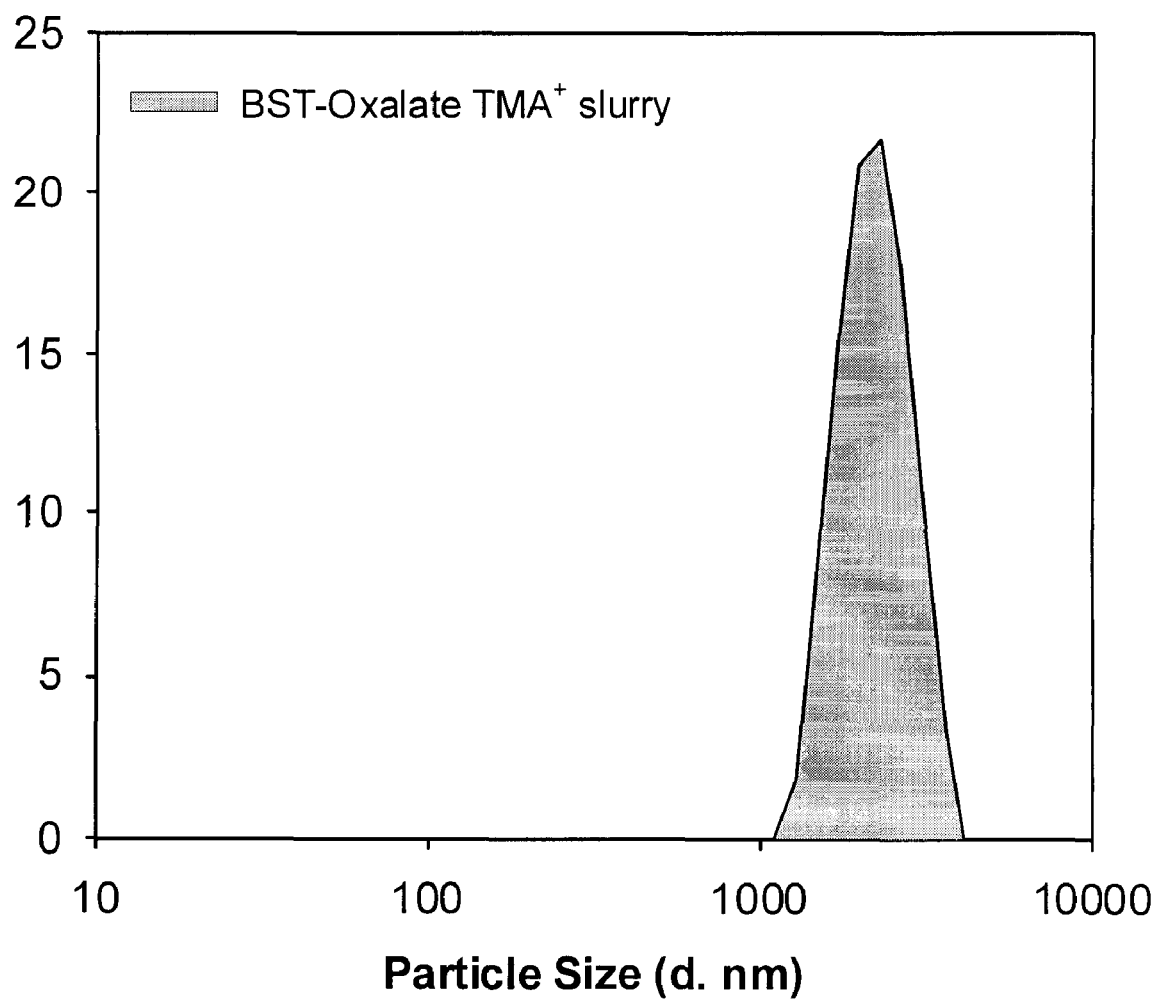
Figure 5:
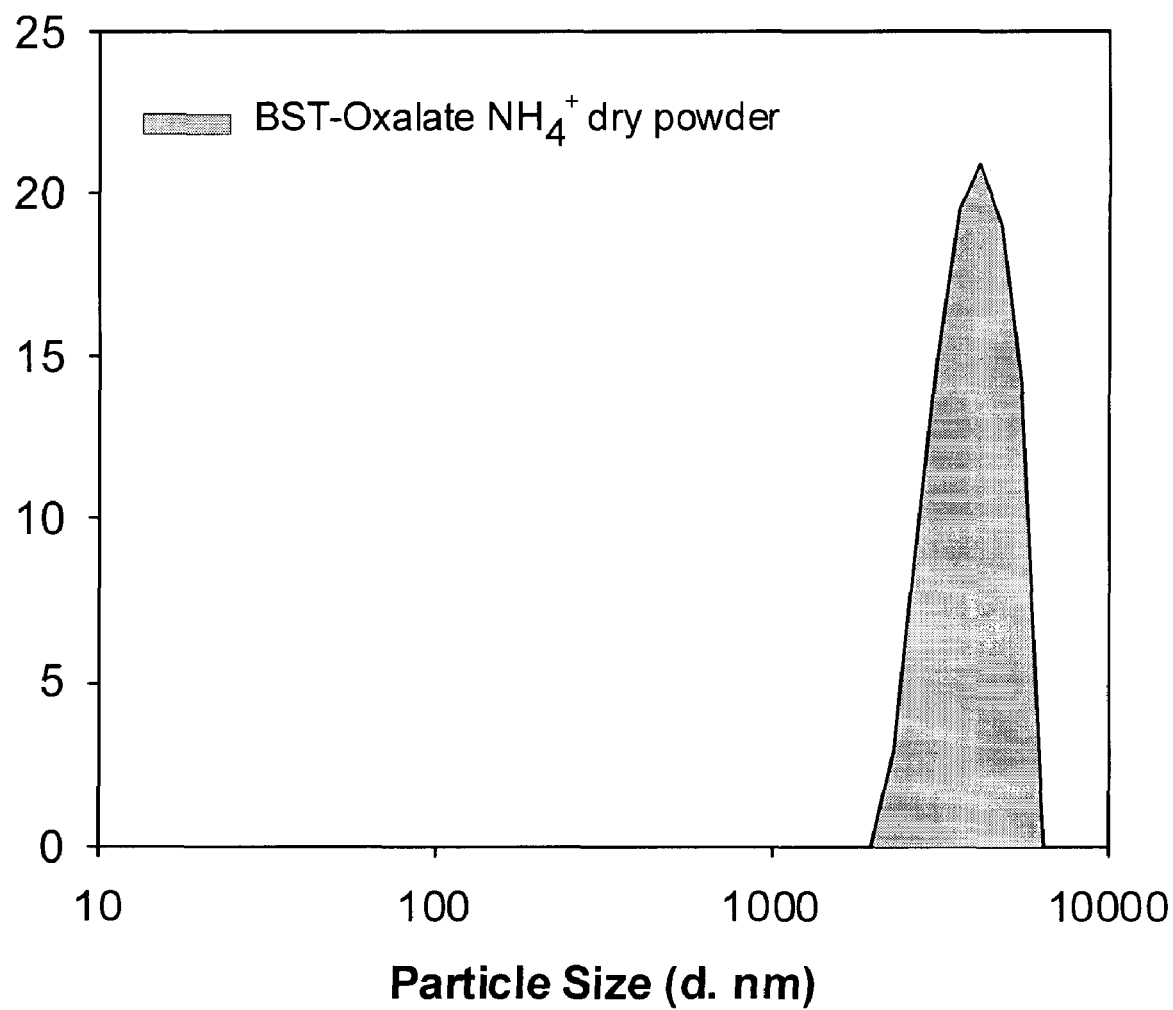
FIGS. 5 and 6 are graphs showing the average particle size and particle size range distribution for redispersed precipitates made in accordance with the present invention and with the prior art.
Figure 6:
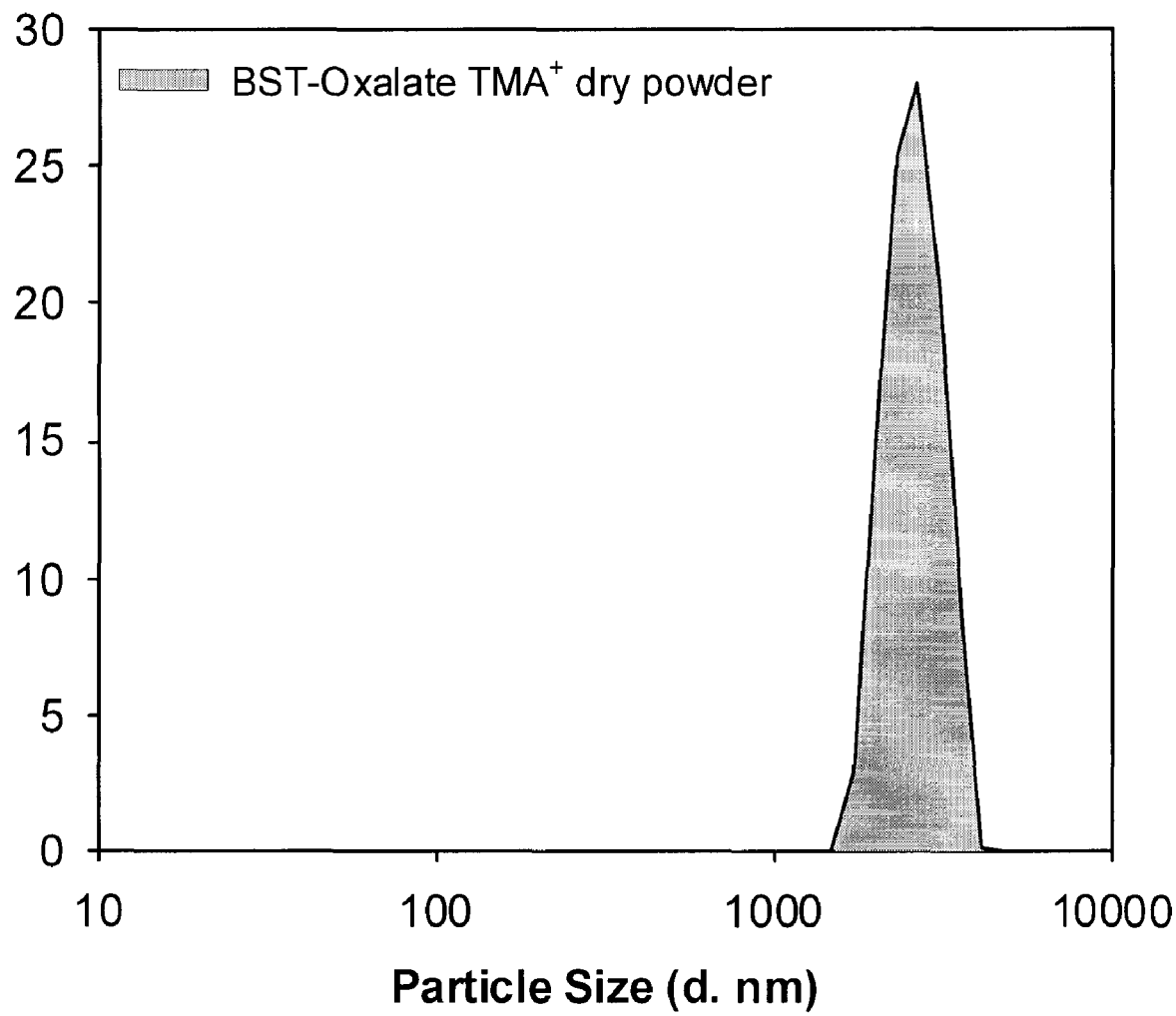

In the following, particle size distributions are measured on a Malvern Zetasizer® Nano ZS-90 particle size measuring apparatus. FIGS. 3-6 are graphs of average particle size and particle size distribution (reported as PDI, the polydispersity index). FIGS. 3 and 4 are graphs showing the average particle size and particle size range distribution for precipitates made in accordance with the present invention and with the prior art. FIGS. 5 and 6 are graphs showing the average particle size and particle size range distribution for redispersed precipitates made in accordance with the present invention and with the prior art.

The products of precipitation of the BST oxalate powder from ammonium oxalate and TMA oxalate show significant differences in particle size distribution, as shown in Table 1 as well as FIGS. 3-6. The average particle size for the Comparative Example 1 precipitate is smaller than the average particle size for the Example 1 precipitate: 937 nm vs. 2165 nm. However, the particle size distribution (PDI) is much broader for the Comparative Example 1 precipitate than for the Example 1 precipitate: 0.243 vs. 0.036. See FIGS. 3 and 4. As is known in the art, slurries containing particles having narrower particle size distribution have distinct advantages in filtration and processing and have more uniformity in settling rate, etc.

After drying, the TMA prepared BST oxalate powders can be redispersed and show a slight increase in average particle size. The ammonium BST oxalate powders show almost 4× increase in average particle size on redispersal. This effect is shown in FIGS. 5 and 6.

TABLE 1

BST Oxalate precursor powder properties

| Sample[1] | Particle Size | |
|---|---|---|
| | Av. Particle size (nm) | PDI[3] |
| BST Oxalate-$NH_4^+$ slurry | 937 | 0.243 |
| BST Oxalate -$TMA^+$ slurry | 2165 | 0.036 |
| BST-Oxalate $NH_4^+$ dry powder redispersed[2] | 3660 | 0.181 |
| BST--Oxalate $TMA^+$ dry powder redispersed | 2376 | 0.196 |

Notes:
[1] The slurry samples tested are prepared by diluting a slurry sample of the precipitate taken prior to centrifugation.
[2] The dry powder samples are obtained by drying the precipitate at 120° C. overnight and redispersing in supernatant solution.
[3] As is known in the art, the Poly Dispersity Index (PDI) is a measure of the relative numbers of particles having specific particle sizes within the range of particle sizes in the sample.

Analysis of the Supernatants from Example 1 and Comparative Example 1

The supernatant solutions from Example 1 and Comparative Example 1 are analyzed for barium, strontium and titanium by Direct Current Plasma (DCP) using a Beckman SpectraSpanIV®. The levels of these metals remaining in the supernatant provide a relative measurement of the efficiency of the precipitation process using the respective precipitating agents. It is considered that the lower the metal content of the supernatant liquid, the greater the efficiency of the reaction and precipitation process.

| Procedure | Precipitating Agent | Barium, PPM | Strontium, PPM | Titanium, PPM |
|---|---|---|---|---|
| Comparative Example 1 | Ammonium Oxalate | 19.0 | 7.11 | 71.0 |
| Example 1 | Tetramethylammonium Oxalate | 14.74 | 5.02 | 5.01 |

As is evident form the metal content of the supernatant liquids, use of the onium dicarboxylate, tetramethylammonium oxalate, in this example results in significantly lower content of metal in the supernatant. This indicates a more complete reaction and more efficient precipitation in the Example 1, in accordance with an embodiment of the present invention, than is obtained with the prior art method of Comparative Example 1.

Although the invention has been shown and described with respect to certain embodiments, equivalent alterations and modifications will occur to others skilled in the art upon reading and understanding this specification and the annexed drawings. With particular regard to the various functions performed by the above described integers (components, assemblies, devices, compositions, steps, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

The invention claimed is:

1. A process of producing a ceramic powder comprising:
providing a plurality of precursor materials in solution, wherein each of the plurality of precursor materials in solution further comprises at least one constituent ionic species of a ceramic powder;
combining the plurality of precursor materials in solution with an onium dicarboxylate precipitant solution to cause co-precipitation of the ceramic powder precursor in a combined solution; and
separating the ceramic powder precursor from the combined solution,
wherein the onium dicarboxylate comprises a tertiary sulfonium having general formula (III):

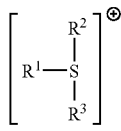

(III)

wherein in formula (III), $R^1$, $R^2$ and $R^3$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms, when substituted, said substitution comprises one or more substituent selected from any of the foregoing alkyl, hydroxyalkyl or alkoxyalkyl groups, or $R^1$ and $R^2$ or $R^3$ together with A may form a heterocyclic group provided that if the heterocyclic group contains a C=S group, $R^3$ is the second bond.

2. A process of producing a ceramic powder comprising:
providing a plurality of precursor materials in solution, wherein each of the plurality of precursor materials in solution further comprises at least one constituent ionic species of a ceramic powder;
combining the plurality of precursor materials in solution with an onium dicarboxylate precipitant solution to cause co-precipitation of the ceramic powder precursor in a combined solution; and
separating the ceramic powder precursor from the combined solution,
wherein the onium dicarboxylate comprises a tertiary sulfoxonium having general formula (IV):

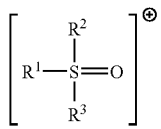

(IV)

wherein in formula (IV), $R^1$, $R^2$ and $R^3$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms, when substituted, said substitution comprises one or more substituent selected from any of the foregoing alkyl, hydroxyalkyl or alkoxyalkyl groups, or $R^1$ and $R^2$ or $R^3$ together with A may form a heterocyclic group provided that if the heterocyclic group contains a C=S group, $R^3$ is the second bond.

3. A process of producing a ceramic powder comprising:
providing a plurality of precursor materials in solution, wherein each of the plurality of precursor materials in solution further comprises at least one constituent ionic species of a ceramic powder;
combining the plurality of precursor materials in solution with an onium dicarboxylate precipitant solution to cause co-precipitation of the ceramic powder precursor in a combined solution; and
separating the ceramic powder precursor from the combined solution,
wherein the onium dicarboxylate comprises an imidazolium having general formula (V):

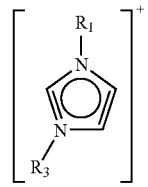

(V)

wherein in formula (V), $R^1$ and $R^3$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms, when substituted, said substitution comprises one or more substituent selected from any of the foregoing alkyl, hydroxyalkyl or alkoxyalkyl groups.

4. A process of producing a ceramic powder comprising:
providing a plurality of precursor materials in solution, wherein each of the plurality of precursor materials in solution further comprises at least one constituent ionic species of a ceramic powder;
combining the plurality of precursor materials in solution with an onium dicarboxylate precipitant solution to cause co-precipitation of the ceramic powder precursor in a combined solution; and
separating the ceramic powder precursor from the combined solution,
wherein the onium dicarboxylate comprises tetramethyl ammonium oxalate and a second onium oxalate wherein the second onium has a general formula (II):

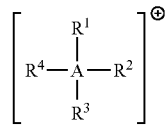

(II)

wherein in formula (II), A is a nitrogen or phosphorus atom, $R^1$, $R^2$, $R^3$ and $R^4$ are each independently an alkyl group containing from 4 to about 20 carbon atoms.

5. The process of claim 4 wherein the onium dicarboxylate comprises one or more of oxalate, malonate, succinate, glutarate, adipate, carbonate, maleate, fumarate, phthalate, isophthalate and terephthalate.

6. The process of claim 4 wherein the precursor materials comprise ions of one or a combination of two or more of: Mg, Ca, Sr, Ba, Al, Si, Sc, Ti, V, Cr, Mn, Fe, Co, Ni, Cu, Zn, Ga, Ge, Y, Zr, Nb, Mo, Tc, Ru, Rh, Th, Pd, Ag, Cd, In, Sn, Sb, Si, La, Hf, Ta, W, Re, Os, Ir, Pt, Tl, Pb, Bi, Ce, Pr, Nd, Pm, Sm, Eu, Gd, Dy, Er, Ho, Er, Tm, Tb, Th, Pa, U, Np and Pu.

7. The process of claim 4 further comprising calcining the ceramic powder precursor to form a ceramic powder.

8. The process of claim 7 wherein the calcining is carried out at a temperature in the range from about 200° C. to about 1500° C. for a time in the range from about 1 minute to about 24 hours.

9. The process of claim 7 further comprising sintering the ceramic powder subsequent to the calcining.

10. The process of claim 9 wherein the sintering is carried out at a temperature in the range from about 1000° C. to about 3000° C. for a time in the range from about 1 minute to about 24 hours.

11. The process of claim 4 wherein the ceramic powder exhibits at least one improved property comprising one or more of improved particle size distribution, reduced particle size, reduced metal impurities and improved particle morphology, improved compositional homogeneity, improved control of stoichiometry, improved re-dispersability and enhanced chemical stability, as compared to a ceramic powder made by a process not including the onium dicarboxylate as precipitant.

* * * * *